United States Patent [19]

Russell et al.

[11] Patent Number: 5,905,248
[45] Date of Patent: May 18, 1999

[54] SYSTEM AND METHOD FOR CARRYING OUT INFORMATION-RELATED TRANSACTIONS USING WEB DOCUMENTS EMBODYING TRANSACTION ENABLING APPLETS AUTOMATICALLY LAUNCHED AND EXECUTED IN RESPONSE TO READING URL-ENCODED SYMBOLS POINTING THERETO

[75] Inventors: Garrett Russell, Newark, Del.; David M. Wilz, Sr., Sewell; Carl Harry Knowles, Morristown, both of N.J.

[73] Assignee: Metrologic Instruments, Inc., Blackwood, N.J.

[21] Appl. No.: 08/916,694

[22] Filed: Aug. 22, 1997

Related U.S. Application Data

[63] Continuation-in-part of application No. 08/905,903, Aug. 4, 1997, application No. 08/869,164, Jun. 4, 1997, application No. 08/846,219, Apr. 25, 1997, application No. 08/838,501, Apr. 7, 1997, application No. 08/645,331, Sep. 24, 1996, application No. 08/615,054, Mar. 12, 1996, application No. 08/573,949, Dec. 18, 1995, application No. 08/292,237, Aug. 17, 1994, Pat. No. 5,767,499, application No. 08/365,193, Dec. 28, 1994, Pat. No. 5,557,093, application No. 08/293,493, Aug. 19, 1994, Pat. No. 5,525,789, application No. 08/561,479, Nov. 20, 1995, Pat. No. 5,661,292, application No. 08/278,109, Nov. 24, 1993, Pat. No. 5,484,992, application No. 08/489,305, Jun. 9, 1995, abandoned, application No. 08/476,069, Jun. 7, 1995, Pat. No. 5,591,953, and application No. 08/584,135, Jan. 11, 1996, Pat. No. 5,616,908, which is a continuation of application No. 08/651,951, May 21, 1996, which is a continuation of application No. 08/489,305, Jun. 9, 1995, abandoned, which is a continuation of application No. 07/821,917, Jan. 16, 1992, abandoned, which is a continuation-in-part of application No. 07/583,421, Sep. 17, 1990, Pat. No. 5,260,553, and application No. 07/580,740, Sep. 11, 1990, abandoned, said application No. 08/838,501, is a continuation-in-part of application No. 08/820,540, Mar. 19, 1997, which is a continuation-in-part of application No. 08/753,367, Nov. 25, 1996.

[51] Int. Cl.$^6$ ..................................................... G06K 7/10
[52] U.S. Cl. ........................................... 235/462; 235/472
[58] Field of Search .................................... 235/380, 381, 235/388, 388.5, 492, 462, 472, 475, 470, 469

[56] References Cited

U.S. PATENT DOCUMENTS

| | | | |
|---|---|---|---|
| 5,490,217 | 2/1996 | Wang et al. | 380/51 |
| 5,600,253 | 2/1997 | Cohen et al. | 324/644 |
| 5,635,694 | 6/1997 | Tuhro | 235/375 |
| 5,640,193 | 6/1997 | Wellner | 348/7 |

*Primary Examiner*—Thien Minh Le
*Attorney, Agent, or Firm*—Thomas J. Perkowski, Esq.

[57] ABSTRACT

A novel transaction-enabling method and system are disclosed, wherein a transaction-enabling Java-Applet is embedded within an HTML-encoded document stored in an HTTP server at predetermined URL. When a code symbol (e.g., magstripe or bar code) encoded with the URL is read using a code symbol reader interfaced with a Java-enabled Internet terminal, the corresponding HTTP document is automatically accessed and displayed at the terminal, and the transaction-enabling Java-Applet initiated for execution so that the customer, consumer or client desiring the transaction can simply and conveniently conduct the information-related transaction over the Internet. The transaction-enabling Internet terminal can be in the form of an Internet kiosk installed in a public location, in the manner as conventional ATMs. By virtue of the present invention, universal transaction machine (UTMs) can be easily deployed for use by the mass population so that they can easily conduct various types of transaction over the Internet.

22 Claims, 12 Drawing Sheets

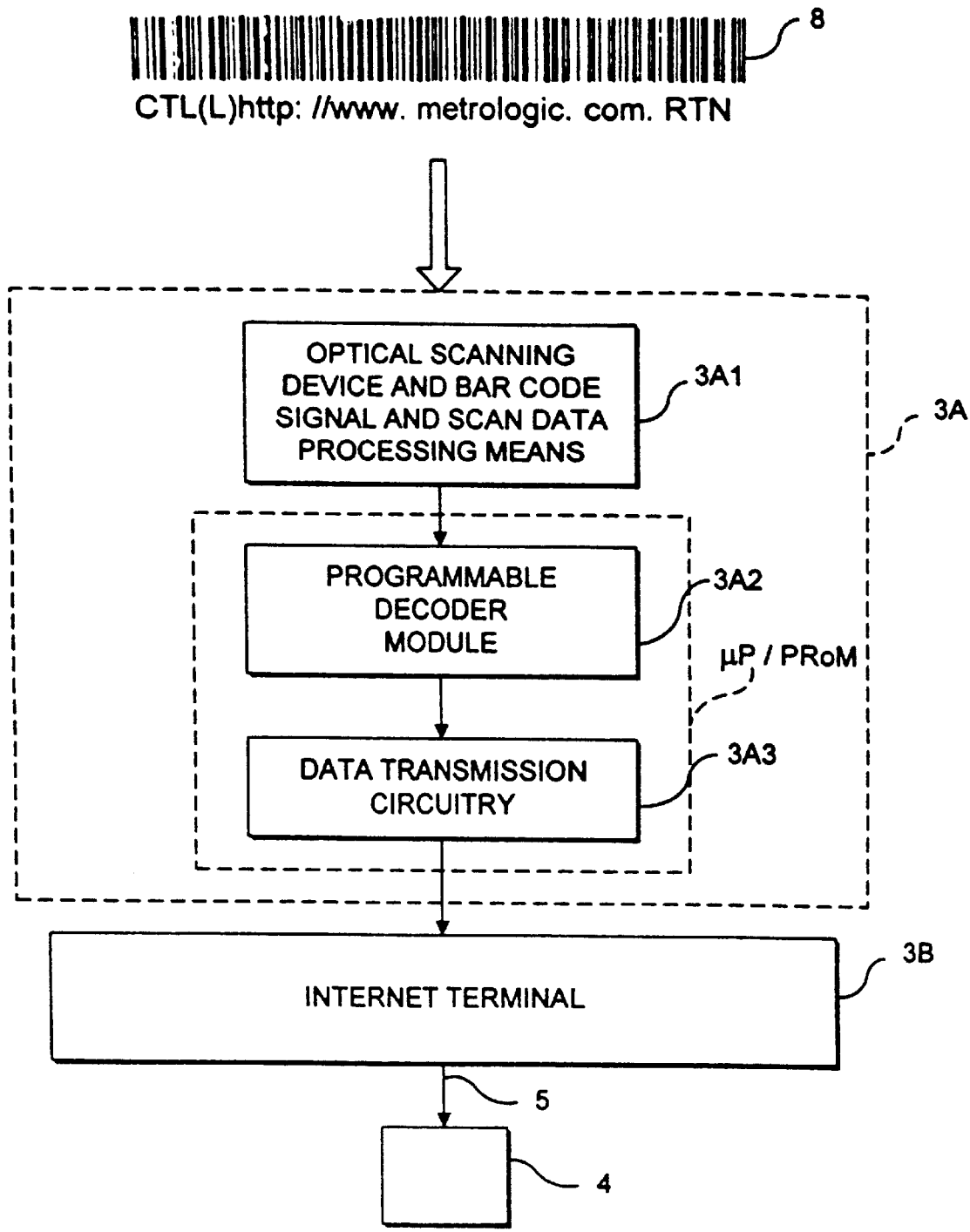
F I G. 1B

CTL(L) http: //www. pepsi. com RTN
FIG. 1F
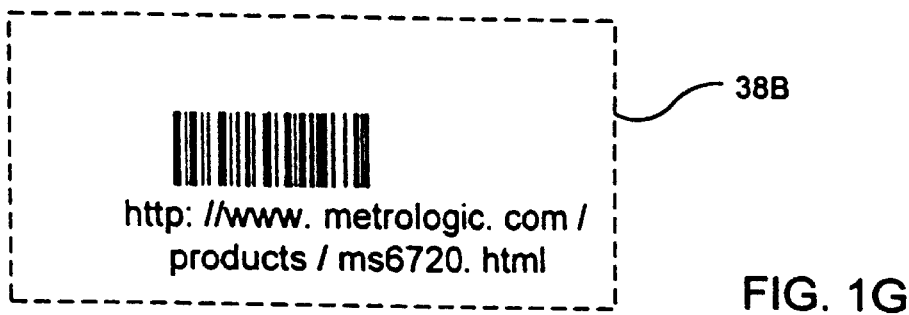
FIG. 1G
CTL(L) http: //www. metrologic. com RTN
CTL(L)/products / ms6720. html RTN
FIG. 1H
CTL(L) http: //www. clearlake. ibm. com/mfg/bocaraton
FIG. 1I
CTL(L) http: //www. moore. com/labels/
(keyboard/bar coded characters)
FIG. 1J
0CH 68H 74H 74H 3AH 2FH 77H 77H 77H 2EH 6DH 6FH 72H 63H 6FH 6DH 61H 62H 65H 6CH 73H 2FH Hex signifies hexidecimal and is not transmitted
FIG. 1K

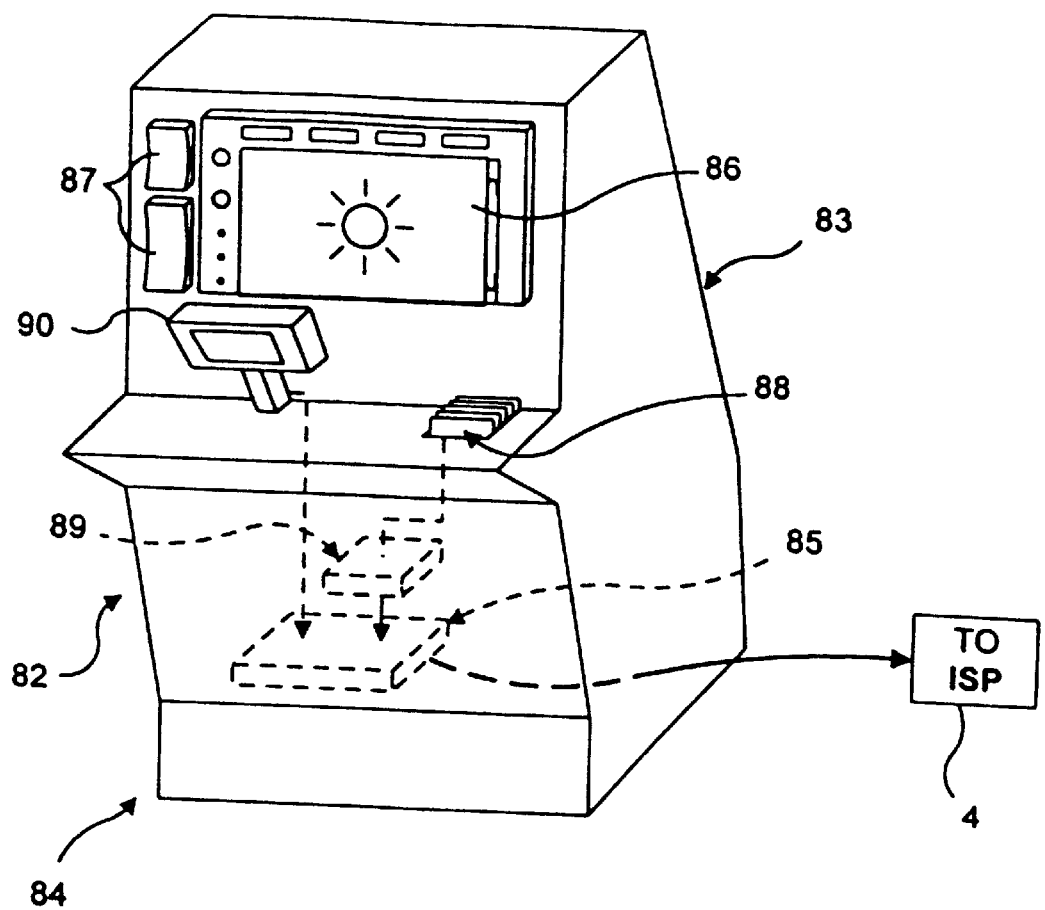
F I G. 6
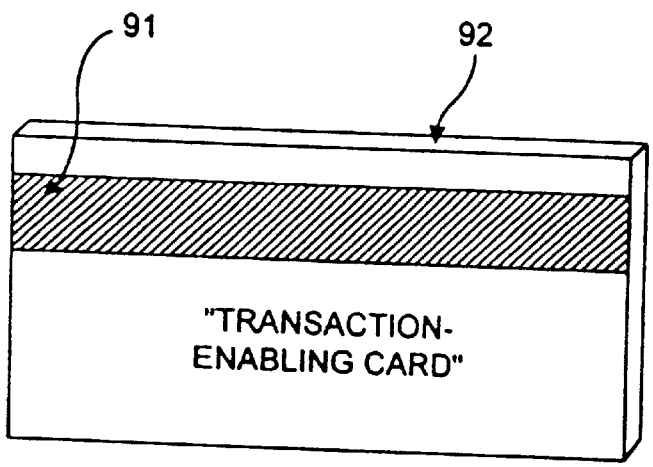
F I G. 6A

SYSTEM AND METHOD FOR CARRYING OUT INFORMATION-RELATED TRANSACTIONS USING WEB DOCUMENTS EMBODYING TRANSACTION ENABLING APPLETS AUTOMATICALLY LAUNCHED AND EXECUTED IN RESPONSE TO READING URL-ENCODED SYMBOLS POINTING THERETO

RELATED CASES

This Application is a Continuation-in-part of: copending application Ser. No. 08/905,903 entitled "BODY-WEARABLE BAR CODE SYMBOL DRIVEN SYSTEM FOR ACCESSING INFORMATION RESOURCES ON THE INTERNET", by inventors C. Harry Knowles and David M. Wilz, Sr., filed Aug. 4, 1997; copending application Ser. No. 08/869,164 filed Jun. 4, 1997; copending application Ser. No. 08/846,219 entitled "Programmed Bar Code Symbol Reader For Accessing Internet-based Information Resources By Scanning Java-Applet Encoded Bar Code Symbols", filed Apr. 25, 1997; copending application Ser. No. 08/838,501 entitled "Internet-Based System And Method For Tracking Objects Bearing URL-Encoded Bar Code Symbols" by David M. Wilz, Sr. and C. Harry Knowles, filed Apr. 7, 1997, which is a Continuation-in-Part of copending application Ser. No. 08/820,540 entitled "System And Method For Composing And Printing URL-encoded bar code symbol Lists And Menus For Use In Visiting Internet-Based Information Resources By Scanning The Same" by Harry Knowles, filed Mar. 19, 1997, which is a Continuation-in-part of copending application Ser. No. 08/753,367 filed Nov. 25, 1996; copending application Ser. No. 08/645,331 filed Sep. 24, 1996; copending application Ser. No. 08/615,054 filed Mar. 12, 1996; copending application Ser. No. 08/573,949 filed Dec. 18, 1995; application Ser. No. 08/292,237 filed Aug. 17, 1994 now U.S. Pat. No. 5,767,499; application Ser. No. 08/365,193 filed Dec. 28, 1994 now U.S. Pat. No. 5,557,093; application Ser. No. 08/293,493 filed Aug. 19, 1994 now U.S. Pat. No. 5,525,789; application Ser. No. 08/561,479 filed Nov. 20, 1995 now U.S. Pat. No. 5,661,292; application Ser. No. 08/278,109 filed Nov. 24, 1995 now U.S. Pat. No. 5,484,992; application Ser. No. 08/489,305 filed Jun. 9, 1995 now abandoned; Ser. No. 08/476,069 filed Jun. 7, 1995 now U.S. Pat. No. 5,591,953; application Ser. No. 08/584,135 filed Jan. 11, 1996 now U.S. Pat. No. 5,616,908; which is a continuation of copending application Ser. No. 08/651,951 filed May 21, 1996 which is a continuation of application Ser. No. 08/489,305 filed Jun. 9, 1995 now abandoned which is a continuation of application Ser. No. 07/821,917 filed Jan. 16, 1992, now abandoned, which is a continuation-in-part of application Ser. No. 07/583,421 filed Sep. 17, 1990, now U.S. Pat. No. 5,260,553, and application Ser. No. 07/580,740 filed Sep. 11, 1990, now abandoned. Each said patent application is assigned to and commonly owned by Metrologic Instruments, Inc. of Blackwood, N.J., and is incorporated herein by reference in its entirety.

BACKGROUND OF INVENTION

1. Field of Invention

The present invention is directed to a novel system and method for carrying out information-related transactions (e.g., electronic commerce) using Web documents (i.e., Web pages) which embody transaction-enabling applets that are automatically launched and executed in response to reading code symbols embodying Uniform Resource Locators (URLs) pointing thereto.

2. Background of the Invention

Presently, most information-related transactions, including financial transactions, product-purchases, service procurement, insurance claim reporting, information-access, and the like, are carried out using the telephone and information (e.g., personal identification number, etc.) preprinted on a credit-size card which functions as a transaction card. Some financial transactions (e.g., cash deposits and/or withdrawals) require the use of special machines called automated teller machines (ATMs). While developments in telephony and speech technology have made telephone-based transactions more economical in recent years, there are nevertheless practical restrictions imposed on the types of transactions that one can easily carry out over the telephone.

In response to the shortcomings and drawbacks associated with telephonic-based transactions, many product vendors and service providers have launched Internet sites on the World-Wide Web (i.e., "Web-sites") to enable their customers to carry out various types of transactions using an Internet browser program, such as the Navigator® from Netscape Communications, Inc. or the Internet Explorer® from Microsoft, Inc. While the development of the Hyper-Text Mark-up Language (HTML) and GUI-based Web browser programs have made accessing Web-sites relatively simple, the fact remains that many consumers are uncomfortable using conventional Web browsers, and thus would rather carry out transactions using the telephone. Consequently, these consumers cannot enjoy benefits associated with Internet-based information transactions, while product vendors and service providers cannot enjoy the savings and benefits associated with Internet-based transactions.

Thus, there is a great need in the art for an improved system and method of carrying out information-related transactions (as well as electronic commerce) over the Internet while avoiding the shortcomings and drawbacks of prior art systems and methodologies.

OBJECTS AND SUMMARY OF THE PRESENT INVENTION

Accordingly, it is a primary object of the present invention to provide an improved system and method of carrying out information-related transactions (as well as electronic commerce) over the Internet while avoiding the shortcomings and drawbacks of prior art systems and methodologies.

An further object of the present invention is to provide such a system, in which a Web page embodying an transaction-enabling Applet is automatically served to the client system in response to reading a DN/PN-encoded (Domain Name and Path Name encoded) or URL-encoded (Uniform Resource Location encoded) symbol (e.g., bar code symbol or magnetic-stripe) which points to the Web page embodying the transaction-enabling Applet.

A further object of the present invention is to provide such a system, in which each Internet-enabled client computer system is provided with a code symbol reader for reading URL-encoded symbols printed on transaction cards, and other forms of print media, for automatically accessing a Web page from an Internet information server that embodies an Applet particularly designed for carrying out a particular type of information-based transaction over the Internet.

A further object of the present invention is to provide such Internet-Based Transaction-Enabling System, wherein the bar code symbol reader may be a laser scanning bar code symbol reader, a CCD-type bar code symbol, a Wand-type bar code symbol reader, or a magnetic-stripe reader.

Another object of the present invention is to provide such an Internet Transaction System in the form of a desktop, laptop or palmtop computer system that is connected to the Internet by way of an Internet Service Provider (ISP), wherein the computer system has a GUI-based web browser program and a programmed bar code symbol scanner interfaced therewith for automatically accessing Web pages embodying transaction-enabling Applets.

Another object of the present invention is to provide such an Internet Transaction System in the form of a desktop, laptop, palmtop or body-wearable computer system that is connected to the Internet by way of an Internet Service Provider (ISP), wherein the computer system has a GUI-based web browser program and a programmed bar code symbol reader interfaced therewith for automatically accessing transaction-enabling Web pages located in information servers connected to the Internet.

Another object of the present invention is to provide an Internet-based Transaction-Enabling System, in which Java™ Applets are encoded within the structure of HTML-encoded documents (i.e., "Web pages") that are stored on an Internet-based information server and are automatically launched to and displayed by a Java-enabled browser receiving the URL of the HTML-encoded document by reading a URL-encoded symbol on a credit card or other transaction-enabling card.

Another object of the present invention is to provide such a system and method, wherein the Internet Client System is automatically connected to the Internet information resources specified by the scanned Applet-encoded bar code symbol, for local processing and display in accordance with the transaction-enabling Applet.

These and other Objects of the Present Invention will become apparent hereinafter.

BRIEF DESCRIPTION OF THE DRAWINGS

For a more complete understanding of how to practice the Objects of the Present Invention, the following Detailed Description of the Illustrative Embodiments should be read in conjunction with the accompanying Drawings, wherein:

FIG. 1B is a schematic diagram of a bar code-driven Internet-based Transaction-Enabling System according to a first generalized embodiment of the present invention, shown reading a bar code symbol that has been encoded with (i) the program command that writes the URL into the information resource "Goto" window (i.e., "Goto" buffer) of the Internet browser program, (ii) the complete URL of an Applet-containing Web page to be accessed, and (iii) the Internet browser program command that executes a Hyper-Text Transmission Protocol (HTTP) request on the URL entered into the "Goto" window;

FIG. 1F is a graphical representation of an exemplary 1-D (linear) URL-encoded bar code symbol of the present invention, containing ASCII code elements representative of the complete URL of an Applet-containing Web page to be accessed (e.g., http://www.panam.com/reservations) as well the program command (e.g., CTL(L)) that writes the URL into the information resource "Goto" window of the Internet browser program and the program command (e.g., RTN) that executes a HTTP request on the URL entered into the "Goto" window;

FIG. 1G is a graphical representation of an exemplary 2-D URL-encoded bar code symbol of the PDF417 Symbology, encoded according to the principles of the present invention;

FIG. 1H is a graphical representation of an exemplary "multiple 1-D" URL-encoded bar code symbol structure according to the present invention, comprising a pair of discrete 1-D URL-encoded bar code symbols, wherein the first bar code symbol contains ASCII code elements representative of the program command (e.g., CTL(L)) that writes the URL into the "Goto" window of the program, the complete URL of an Applet-containing Web page to be accessed, and the Internet browser program command (e.g., RTN) that executes a HTTP request on the URL entered into the "Goto" window, whereas the second bar code symbol contains ASCII code elements representative of the Internet browser program command (e.g., CTL(L)) that writes the URL into the information resource "Goto" window of the Internet browser program, the Path Name portion of the URL of the Applet-containing Web page to be accessed, and the program command (e.g., RTN) that executes a HTTP request on the URL entered into the "Goto" window;

FIG. 1I is a graphical representation of an exemplary 1-D URL-encoded bar code symbol of the present invention, containing ASCII code elements representative of the program command (e.g., CTL(L)) that writes the URL into the information resource "Goto" window of the Internet browser program, the complete URL of an Applet-containing Web page to be accessed including the Path Name portion thereof, and the program command (e.g., RTN) that executes a HTTP request on the entered URL upon the reading of the bar code symbol;

FIG. 1J is a graphical representation of an exemplary 1-D URL-encoded bar code symbol of the present invention, containing ASCII code elements representative of the Internet browser program command (e.g., CTL(L)) that writes the URL into the information resource "Goto" window of the Internet browser program, the complete URL of an Applet-containing Web page to be accessed including the Domain Name and Path Name portion thereof, and the Internet browser program command (e.g., RTN) that executes a HTTP request on the entered URL upon the reading of the bar code symbol;

FIG. 1K is a graphical representation of the hexadecimal number string corresponding to the exemplary 1-D URL-encoded bar code symbol of FIG. 1J that is transmitted from the bar code symbol reader to the Internet browser program of the Internet-based Transaction-Enabling System of the present invention;

FIG. 6 is a schematic representation of the fifth illustrative embodiment of the present invention in the form of a kiosk-type Internet-based Transaction-Enabling System, in which a magnetic stripe reader is provided for reading URL-encoded mag-stripe transaction cards and a 2-D bar code symbol reader is provided for reading URL-encoded bar code symbols for the purpose of automatically launching Web document(s) (from Web Servers) containing transaction-enabling Java-Applets.

DETAILED DESCRIPTION OF THE ILLUSTRATIVE EMBODIMENTS OF THE PRESENT INVENTION

The illustrative embodiments of the present invention will be described with reference to the figure drawings wherein like elements and structures are indicated by like reference numbers.

Overview Of The Internet-based Transaction-Enabling System Hereof

In general, the system and method of the present invention is practiced in connection with a globally-based digital packed-switched telecommunications network (known as the Internet). The function of the Internet is to provide an infrastructure that supports wired and wireless digital telecommunications throughout the world using the well known TCP/IP networking protocols. In general, the Internet infrastructure comprises Internet Service Providers (ISPs), Network Service Providers (NSPs), routers, telecommunication lines and channels. etc., all well known in the art.

Figure 1:
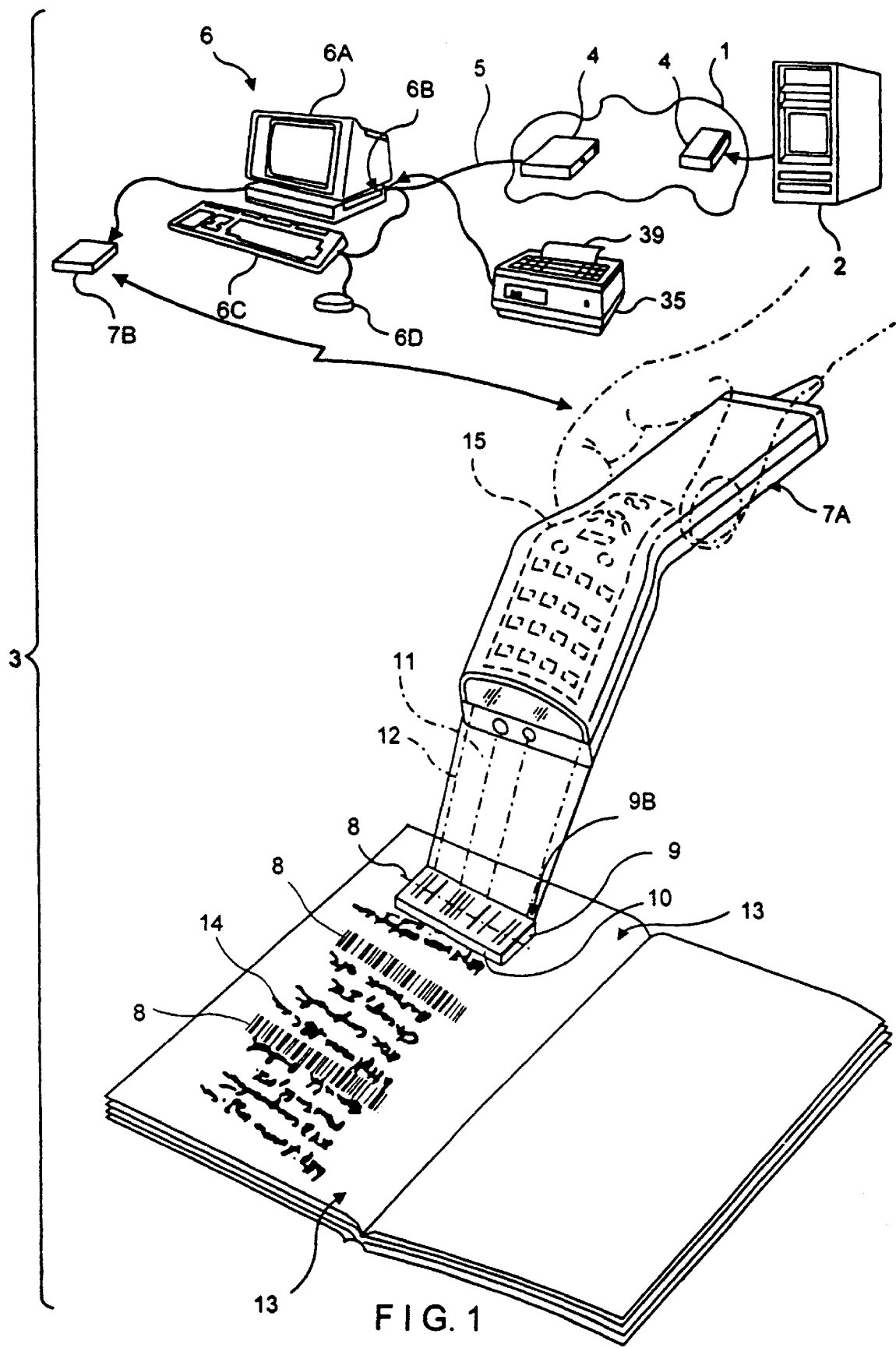
FIG. 1 is a schematic diagram of the first preferred embodiment of the present invention, in which the Internet-based Transaction-Enabling System hereof is realized in the form of a desktop computer system shown connected to the Internet by way of an ISP, and having a GUI-based web browser program and a bar code symbol scanner for automatically accessing transaction-enabling Web pages containing transaction-enabling Applets, by simply scanning corresponding URL-encoded bar code symbols.

As shown in FIG. 1, many Internet Web-site Servers (i.e., information-serving computer systems) 2 physically located throughout the world are connected to the Internet 1 by way of the Internet infrastructure (i.e., ISPs and NSPs). As the name implies, the function of an Internet Server 2 is to serve information resources to Internet users when requested to do so by a client computer system. The location of each and every information resource on an information server connected to the Internet infrastructure is specified by a Uniform Resource Locator (URL), the syntax of which is well known in the art.

In accordance with the principles of the present invention, an HTML-encoded document (i.e., Web page) and a transaction-enabling Java™-Applet are created. The Java-Applet is designed to enable a particular transaction to be carried out using one of the Internet-based Transaction-Enabling Systems of the present invention. Then the Java-Applet is then embedded within the HTML-encoded document and thereafter, the information file associated with Applet-embedded HTML document is stored in an HTTP server (i.e., Web server) along with the compiled code associated with the Java-Applet. The location of the transaction-enabling HTML document (i.e., Web page) is determined by the URL which specifies the location of information file in the HTML server Hereinafter, any client computer system providing access to such Web pages by scanning one or more URL-encoded symbols shall be referred to as an "Transaction-Enabling System", "Internet-based Transaction-Enabling System" or "Internet Transaction-Enabling Terminal", generally indicated by reference number 3 in the figure drawings.

In general, each Internet Information Server 2 and client system 3 may be connected to the Internet infrastructure by way of an ISP 4 (or NSP) using physical communication media or a wireless (RF-based) digital communication link 5 well known in the art. Notably, while each illustrative embodiment of the Internet-based Transaction-Enabling System hereof is realized in the form of a Client System operably connected to the infrastructure of the Internet by way of an ISP, it is understood that the Internet connection may be achieved through an NSP or other access point in the Internet infrastructure.

In the illustrative embodiments, each Internet Web-site Server 2 is realized as a computer system running conventional Web-site server software (e.g., WebStars from StarNine, Inc., FASTRAK™ Server from Netscape Communications, Inc, or Microsoft® Internet Information Server from Microsoft Corporation) and is interfaced with an ISP in a conventional manner. Each Internet Web-site Server is assigned a unique TCP/IP address (and Domain Name) on the Internet, and is provided with Internet networking software to support the TCP/IP protocol. In addition, each Internet Web-site server is provided with one or more application software programs for creating and maintaining hypermedia documents containing text, graphics and audio information within an information file structure expressed in HTML. Each HTML document on the WWW is physically served from an HTTP Server 2, at a location specified by its URL.

In general, there are several different ways of accessing transaction-enabling Web documents on the Internet by scanning URL-encoded or DN-encoded code symbols in accordance with the present invention. Four generalized methods of accessing information resources on the Internet using URL-encoded bar code symbols are illustrated in FIGS. 1B, 1C, 1D and 1E. Each of these generalized methods can be carried out within the particular illustrative embodiments of the Internet-based Transaction-Enabling System shown in FIGS. 1, 2, 3, 4 and 6 to be described in great detail hereinafter.

First Generalized Method Of Web Page Access On The Internet Using URL-Encoded Code Symbols In FIG. 1B, a first generalized method of accessing Web pages on the Internet using URL-encoded bar code symbols is illustrated. As shown, this access method can be carried out using an Internet-based Transaction-Enabling System 3 comprising two primary subsystem components, namely: (1) a programmed bar code symbol reader 3A; and (2) an Internet Terminal 3B. The primary function of the programmed bar code symbol reader 3A is to read a bar code symbol that has been encoded with (i) the Internet browser program command that writes the URL into the information resource ""Goto"" window (i.e., "Goto" buffer) of the Internet browser program, (ii) the complete URL of an HTML document to be accessed, and (iii) the Internet browser program command that executes a Hyper-Text Transmission Protocol (HTTP) request on the URL entered into the "Goto" window. The function of the Internet Terminal 3B is to: (1) provide an interconnection to the Internet infrastructure by way of ISP 4 (or NSP) using communication media or link 5; and (2) carry out the client-side of the Internet protocol (e.g., HTTP, FTP, etc.) required to access and display the particular transaction-enabling HTML document (i.e., Web page document) specified by the URL encoded within the bar code symbol.

In general, programmed bar code symbol reader 3A comprises a number of subsystem components, namely: an optical scanning device and scan data processor means 3A1 (e.g., bar code laser scanner, CCD-based bar code scanner, etc.); programmable decoder module 3A2 (e.g., programmed microprocessor with control and decoding algorithms); and data transmission module 3A3. The function of the optical scanning device and scan data processor means 3A1 is to optically scan bar code symbols, and produce words of digital scan data (representative of the length of the bars and spaces of the code symbol) for use in subsequent decode processing. The function of the programmable decoder module 3A2 is to process these words of digital scan data and produce ASCII-based symbol character data representative of the decoded bar code symbol. The function of data transmission circuitry 3A3 is to transmit the ASCII formatted data from decoder module 3A2 to Internet Terminal 3B for use in accessing and displaying the particular transaction-enabling Web page specified by the URL encoded within the decoded bar code symbol.

In FIG. 1B, the Internet-based Transaction-Enabling System of the first generalized embodiment is shown reading a single 1-D URL-encoded bar code symbol. In this generalized embodiment, the URL-encoded bar code symbol contains ASCII code elements that are representative of following information items: (1) the Internet browser program command (e.g., CTL(L)) that writes the URL into the information resource "Goto" window of the Internet browser program; (2) the complete URL of the Web page to be accessed (e.g., http://www.metrologic.com); and (3) the Internet browser program command (e.g., RTN) that executes a HTTP request on the URL entered into the "Goto" window. It is understood, however, such information may be encoded into a 2-D bar code symbol as shown in FIG. 1G, or alternatively into two or more 1-D URL-encoded bar code symbols, as shown in FIG. 1H.

In FIG. 1H, a pair of bar code symbols are used to encoded the information contained in the bar URL-encoded bar code of FIG. 1F. In such an embodiment, the first bar code symbol contains ASCII code elements representative of: (1) the Internet browser program command (e.g., CTL(L)) that writes the URL into the information resource "Goto" window of the Internet browser program; (2) the complete URL of a transaction-enabling HTML document to be accessed (e.g., http://www.metrologic.com/info/trans.html); and (3) the Internet browser program command (e.g., RTN) that executes a HTTP request on the URL entered into the "Goto" window. The second bar code symbol contains ASCII code elements representative of: (1) the Internet browser program command (e.g., CTL(L)) that writes the URL into the information resource "Goto" window of the Internet browser program; (2) the Path Name portion of the URL of the Web page to be accessed (e.g., /Products/ms6720.html); and (3) the Internet browser program command (e.g., RTN) that executes a HTTP request on the URL entered into the "Goto" window. In either of the above illustrative embodiments, it will be common for URL-encoded bar code symbols to include a Path Name portion thereof (e.g., /Mfg/bocaraton), as illustrated in FIG. 1I, which may be of substantial character length in many instances.

These alternative coding techniques can be advantageous where the character length of the URL becomes significantly large, as in the case where the Web page to be accessed is located deep within a number of subdirectories or subfolders of an information server, or within a back-end database connected to the information server by way of a CGI or like mechanism.

At this juncture, a brief discussion about information formats and bar code symbologies is in order. In general, the information that must be encoded into the structure of a bar code symbol in accordance with the present invention is expressible in the ASCII data format. This fact is based on the nature of the characters used in URL specification, browser design and keyboard construction. Thus, any bar code symbology capable of representing the characters in the ASCII character set can be used to practice the information encoding technique of the present invention. In the preferred embodiment, any one of the following bar code symbologies can be used for URL-encoding: Code 128; full ASCII character set of Code 39; and Code 93. While an ASCII formatted character string has been encoded within the bar code symbol of FIG. 1J, the information string actually transmitted from bar code symbol reader 3A to the Internet browser program (of the Internet Terminal 3B) will be typically expressed in the hexadecimal number format shown in FIG. 1K. It is understood, however, that the format of the transmitted information string may differ from embodiment to embodiment of the present invention.

Figure 1A:
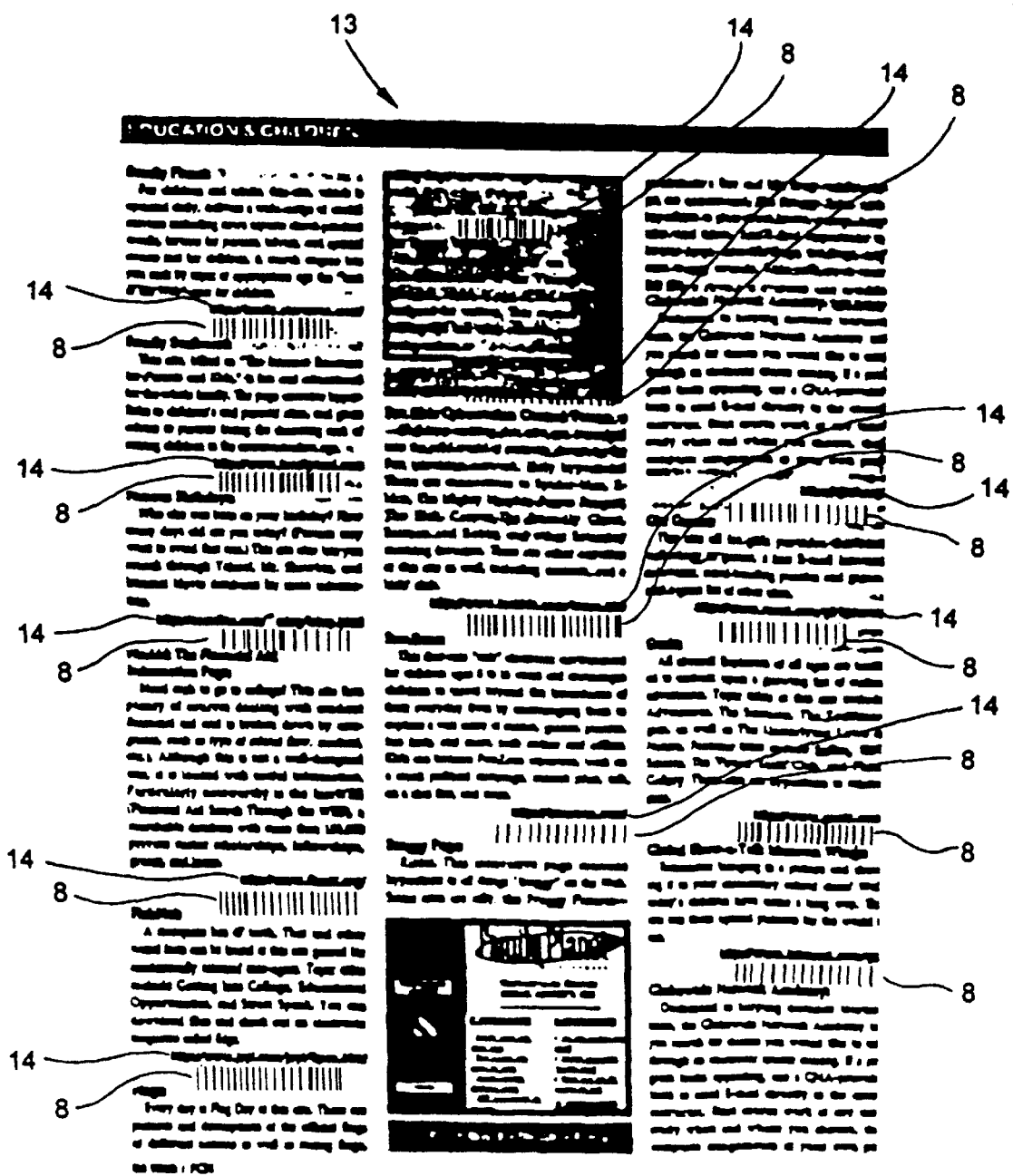
FIG. 1A is schematic representation of a single sheet or page of the Internet Transaction Directory of the present invention, showing several URL-encoded (truncated) bar code symbols printed thereon along with their corresponding human-readable URLs and content descriptions.
Figure 1C:
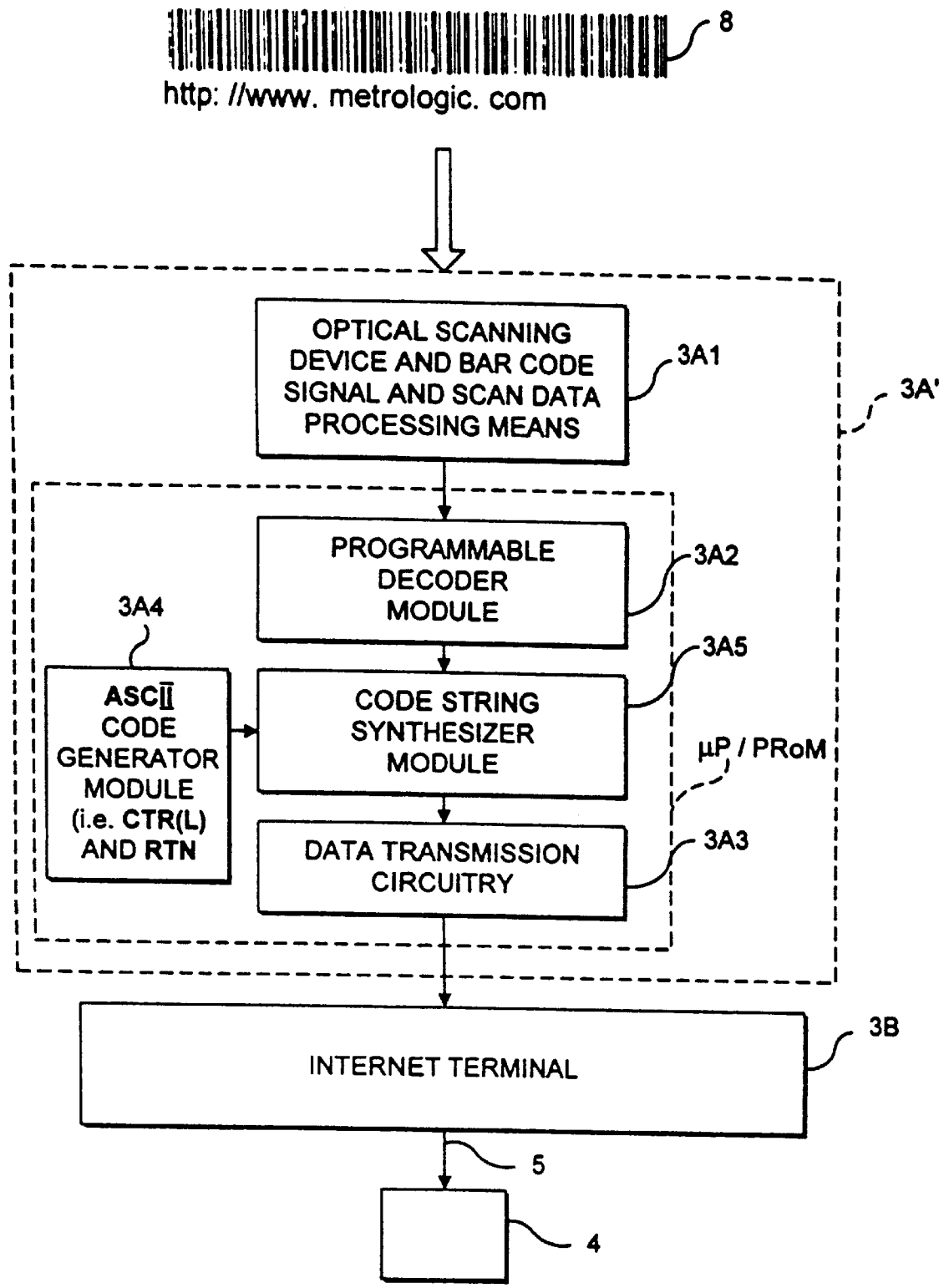
FIG. 1C is a schematic diagram of a bar code-driven Internet-based Transaction-Enabling System according to a second generalized embodiment of the present invention, for automatically (i) reading a bar code symbol that has been encoded with the complete URL of an Applet-containing Web page to be accessed, and (ii) affixing thereto a prefix code string representative of the program command that writes the URL into the information resource "Goto" window of the Internet browser program, and a suffix code string representative of the program command that executes a HTTP request on the URL entered into the "Goto" window.

Second Generalized Method Of Web Page Access On The Internet Using URL-Encoded Code Symbols In FIG. 1C, a second generalized method of accessing Web page(s) on the Internet using URL-encoded bar code symbols is illustrated. As shown, this access method can be carried out using an Internet-based Transaction-Enabling System 3 comprising two primary subsystem components, namely: (1) a programmed bar code symbol reader 3A'; and (2) Internet Terminal 3B. The function of the programmed bar code symbol reader 3A' is to: (i) read a bar code symbol that has been encoded with the complete URL of a transaction-enabling Web page to be accessed; and (ii) affix thereto a prefix code string (i.e., CTR(L)) representative of the Internet browser program command that writes the URL into the information resource "Goto" window of the Internet browser program, and a suffix code string (i.e., RTN) representative of the Internet browser program command that executes a HTTP request on the URL entered into the "Goto" window. The function of the Internet Terminal 3B is to: (1) provide an interconnection to the Internet infrastructure by way of ISP 4 (or NSP) using communication media or link 5; and (2) carry out the client-side of the Internet protocol (e.g., HTTP, FTP, etc.) required to access and display the particular transaction-enabling Web page specified by the URL encoded within the canned bar code symbol.

In general, programmed bar code symbol reader 3A' comprises a number of subsystem components, namely: optical scanning device and scan data processor 3A1 (e.g., bar code laser scanner, CCD-based bar code scanner, etc.); programmable decoder module 3A2 (e.g., programmed microprocessor with control and decoding algorithms); data transmission circuitry 3A3; an ASCII code generation module 3A4; and a code string synthesizer module 3A5. The function of the optical scanning device and scan data processor 3A1 is to scan bar code symbols, and produce words of digital scan data (representative of the length of the bars and spaces of the code symbol) for subsequent decode processing. The function of the programmable decoder module 3A2 is to process such words of digital scan data and produce ASCII-based symbol character data representative of the decoded bar code symbol. The function of the ASCII code generation module 3A3 is to generate (1) an ASCII-based prefix code string (i.e., CTR(L)) representative of the Internet browser program command that writes the URL into the information resource "Goto" window of the Internet browser program, and (2) a suffix code string (i.e., RTN) representative of the Internet browser program command that executes a HTTP request on the URL entered into the "Goto" window. The function of the code string synthesizer module 3A5 is to synthesize the prefix and suffix code strings produced from ASCII code generator 3A4, with the URL character string from programmable decoder module 3A2, in order to form a complete code string for transmission to the Internet browser program by way of data transmission circuitry 3A3. The function of data transmission circuitry 3A3 is to transmit ASCII formatted data from the code string synthesizer module 3A5 to Internet Terminal 3B for use in accessing and displaying the particular transaction-enabling Web page specified by the URL encoded within the decoded bar code symbol.

In FIG. 1C, the Internet-based Transaction-Enabling System of the second generalized embodiment is shown reading a single 1-D URL-encoded bar code symbol. In this generalized embodiment, the URL-encoded bar code symbol contains ASCII code elements representative of the complete URL of a transaction-enabling Web page to be accessed from the Internet. It is understood, however, that the information encoded within the 1-D bar code symbol structure of FIG. 1C can be encoded into a 2-D bar code symbol structure or a pair of 1-D bar code symbols as described hereinabove.

Figure 1D:
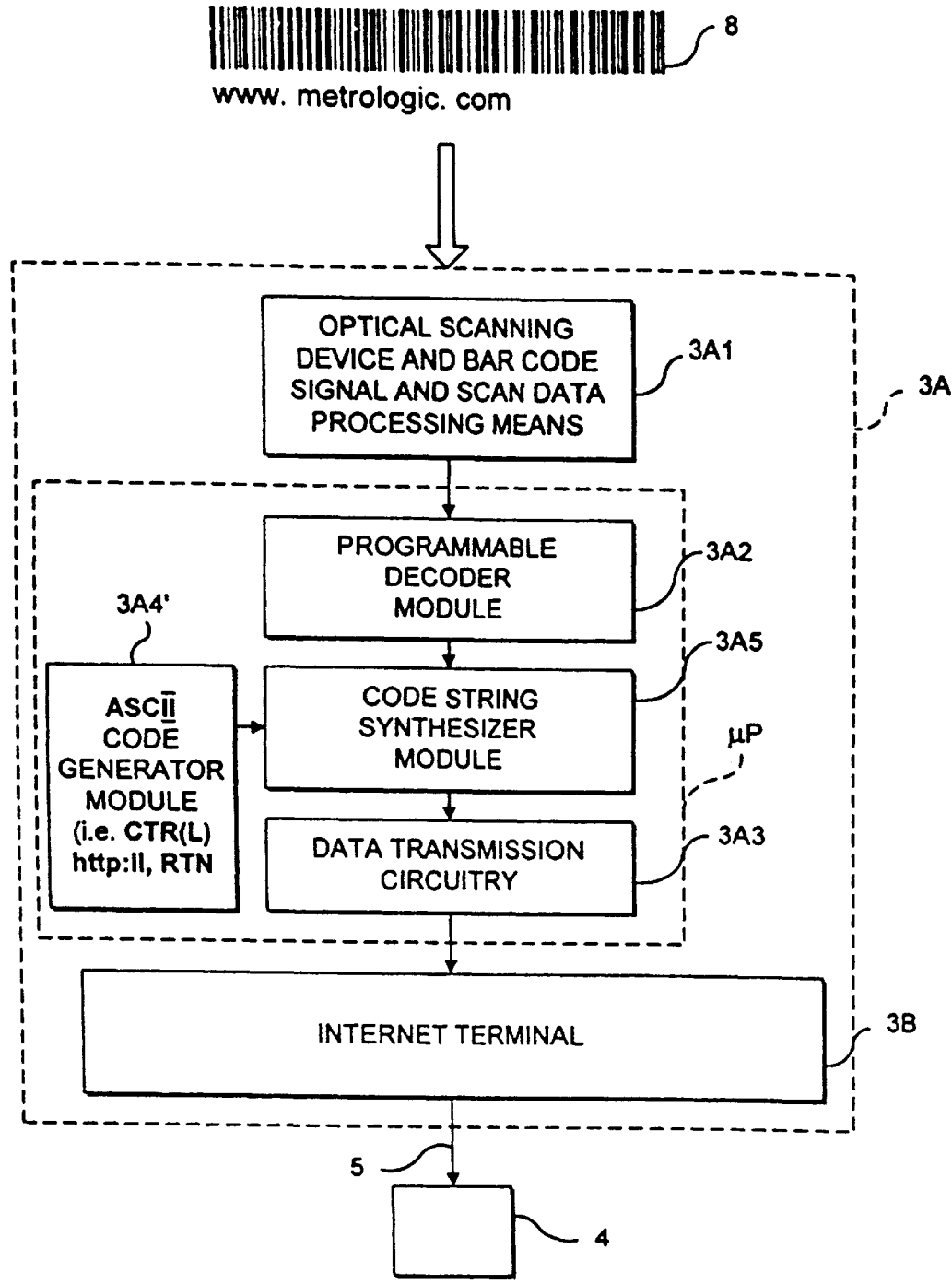
FIG. 1D is a schematic diagram of a bar code-driven Internet-based Transaction-Enabling System according to a third generalized embodiment of the present invention, for automatically (i) reading a bar code symbol that has been encoded with only the Domain Name ((DN) or underlying IP address) and server Path Name portion of the URL of an Applet-containing Web page to be accessed, (ii) affixing thereto prefix code strings representative of (1) the program command that writes the URL into the information resource "Goto" window of the Internet browser program and (2) the Internet protocol identifier (e.g., "http://"), and (iii) affixing thereto suffix code strings representative of the program command that executes a HTTP request on the URL entered into the "Goto" Window.

Third Generalized Method Of Web Page Access On The Internet Using URL-Encoded Code Symbols In FIG. 1D, a third generalized method of accessing information on the Internet using URL-encoded bar code symbols is illustrated. As shown, this access method can be carried out using an Internet-based Transaction-Enabling System 3 comprising two primary subsystem components, namely: (1) a programmed bar code symbol reader 3A; and (2) an Internet Terminal 3B. The function of the programmed bar code symbol reader 3A is to: (i) read a bar code symbol that has been encoded with the complete URL of a transaction-enabling HTML document to be accessed; (ii) affix thereto prefix code strings representative of (1) the Internet browser program command that writes the URL into the information resource "Goto" window of the Internet browser program and (2) the Internet protocol identifier (e.g., "http://"); and (iii) affix thereto a suffix code string representative of the Internet browser program command that executes a HTTP request on the URL entered into the "Goto" Window. The function of the Internet Terminal 3B is to: (1) provide an interconnection to the Internet infrastructure by way of ISP 4 (or NSP) using communication media or link 5; and (2) carry out the client-side of the Internet protocol (e.g., HTTP, FTP, etc.) required to access and display the particular transaction-enabling Web page specified by the URL encoded within the bar code symbol.

In general, programmed bar code symbol reader of this illustrative embodiment 3A' comprises a number of subsystem components, namely: optical scanning device and scan data processor 3A1 (e.g., bar code laser scanner, CCD-based bar code scanner, etc.); programmable decoder module 3A2 (e.g., programmed microprocessor with control and decoding algorithms); data transmission circuitry 3A3; an ASCII code generation module 3A4; and a code string synthesizer module 3A5. The function of the optical scanning device and scan data processor 3A1 is to scan bar code symbols, and produce words of digital scan data (representative of the length of the bars and spaces of the code symbol) for subsequent decode processing. The function of the programmable decoder module 3A2 is to process these words of digital scan data and produce ASCII-based symbol character data representative of the decoded bar code symbol. The function of the ASCII code generation module 3A4', is to generate: (1) an ASCII-based prefix code string (i.e., CTR(L)) representative of the Internet browser program command that writes the URL into the information resource "Goto" window of the Internet browser program; (2) the appropriate Internet protocol identifier (e.g., "http://"); and (3) a suffix code string (i.e., RTN) representative of the Internet browser program command that executes a HTTP request on the URL entered into the "Goto" window. The function of code string synthesizer module 3A5 is to synthesize the URL character code produced by decoder module 3A2, with the code strings produced by ASCII code generator 3A4, in order to form a complete code string for transmission to the Internet browser program by way of data transmission circuitry 3A3. The function of data transmission circuitry 3A3 is to transmit ASCII formatted data from the code string synthesizer module 3A5 to Internet Terminal 3B for use in accessing and displaying the particular transaction-enabling Web page specified by the URL encoded within the decoded bar code symbol.

In FIG. 1D, the Internet-based Transaction-Enabling System of the third generalized embodiment is shown reading a single 1-D URL-encoded bar code symbol. In this generalized embodiment, the URL-encoded bar code symbol contains ASCII code elements representative of the complete URL of a transaction-enabling Web page to be accessed. It is understood, however, that the information encoded within the 1-D bar code symbol structure of FIG. 1D can be encoded into a 2-D bar code symbol or a pair of bar code symbols as indicated hereinabove.

Figure 1E:
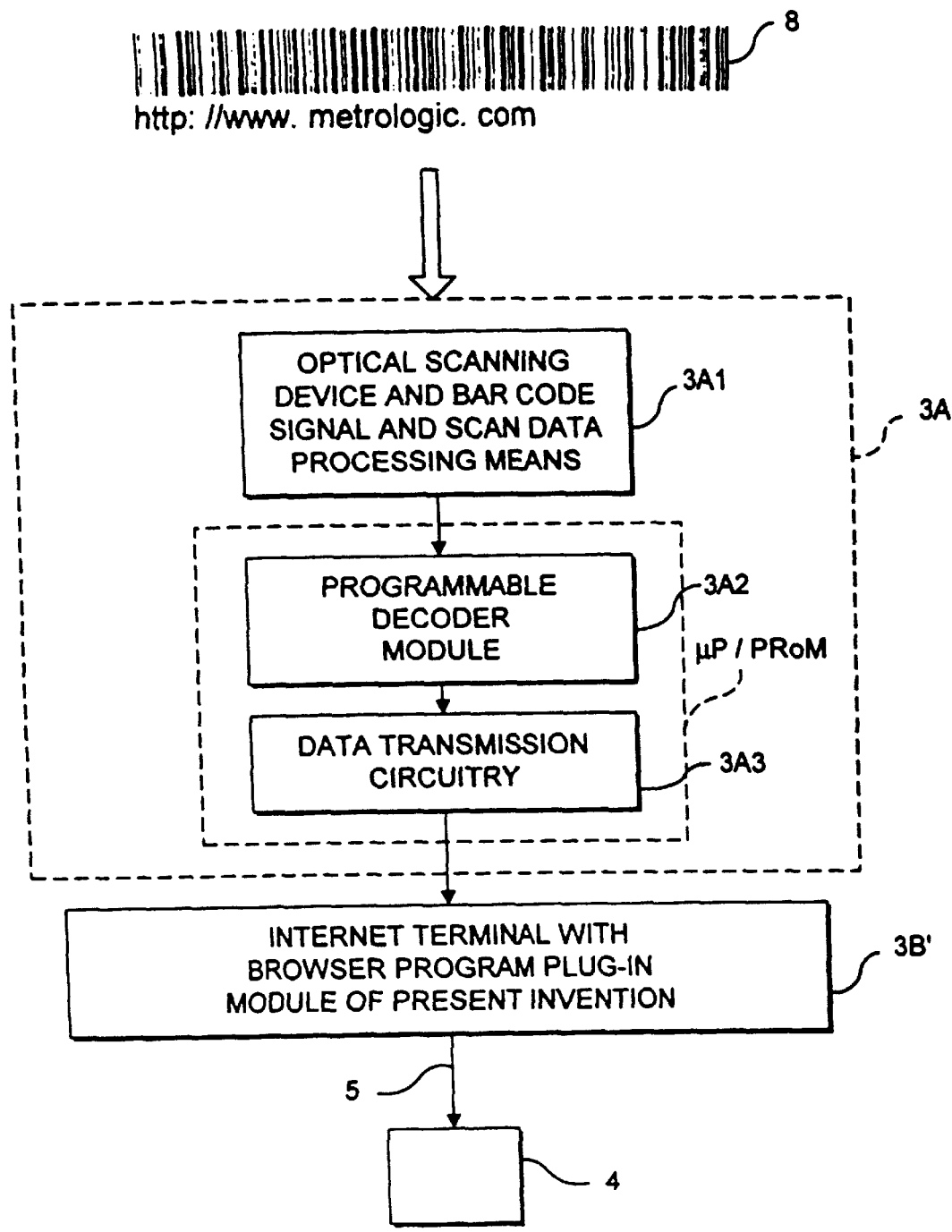
FIG. 1E is a schematic diagram of a bar code-driven Internet-based Transaction-Enabling System according to a fourth generalized embodiment of the present invention for automatically (i) reading a bar code symbol that has been encoded with the complete URL of an Applet-containing Web page to be accessed, (ii) writing the URL into the information resource "Goto" window of the Internet browser program, and (iii) executing a HTTP request on the URL entered into the "Goto" window.

Fourth Generalized Method Of Information Resource Access On The Internet Using URL-Encoded Code Symbols In FIG. 1E, a fourth generalized method of accessing Web pages on the Internet using URL-encoded bar code symbols is illustrated. As shown, this access method can be carried out using an Internet-based Transaction-Enabling System 3 comprising two primary subsystem components, namely: (1) a programmed bar code symbol reader 3A; and (2) an Internet Terminal 3B'. The function of programmed bar code symbol reader 3A is to read a bar code symbol that has been encoded with the complete URL of a transaction-enabling Web page to be accessed. The function of Internet Terminal 3B' is to: (1) provide an interconnection to the Internet infrastructure by way of ISP 4 (or NSP) using communication media or link 5; and (2) carry out the client-side of the Internet protocol (e.g., HTTP, FTP, etc.) using an Internet browser program (e.g., with a plug-in module) which, upon scanning a bar code symbol, automatically writes the URL thereof into the information resource "Goto" window of the Internet browser program and executes a HTTP request on the URL entered into the "Goto" Window.

In general, programmed bar code symbol reader of this illustrative embodiment 3A comprises a number of subsystem components, namely: optical scanning device and scan data processor 3A1 (e.g., bar code laser scanner, CCD-based bar code scanner, etc.); programmable decoder module 3A2 (e.g., programmed microprocessor with control and decoding algorithms); and data transmission module 3A3. The function of the optical scanning device and scan data processor 3A1 is to optically scan bar code symbols, and produce words of digital scan data (representative of the length of the bars and spaces of the code symbol) for subsequent decode processing. The function of the programmable decoder module 3A2 is to process these words of digital scan data and produce ASCII-based symbol character data representative of the decoded bar code symbol. The function of data transmission circuitry 3A3 is to transmit ASCII formatted data from programmable decoder module 3A2 to Internet Terminal 3B for use in accessing and displaying the particular transaction-enabling HTML document specified by the URL encoded within the decoded bar code symbol.

In FIG. 1E, the Internet-based Transaction-Enabling System of the fourth generalized embodiment is shown reading a single 1-D URL-encoded bar code symbol. In this generalized embodiment, the URL-encoded bar code symbol contains ASCII code elements representative of the complete URL of a transaction-enabling Web page to be accessed. It is understood, however, that the information encoded within the bar code symbol structure of FIG. 1E can be encoded into a 2-D bar code symbol or a pair of 1-D bar code symbols as indicated hereinabove.

The generalized embodiments of the Internet-based Transaction-Enabling System of the present invention shown in FIGS. 1C through 1E and described above can be realized in a variety of ways using different types of enabling technology and system configurations tailored to the particular applications at hand. Three different particular embodiments of the Internet-based Transaction-Enabling System will now be described below in detail with reference to FIGS. 1, 2 and 3.

First Preferred Embodiment Of The Internet-based Transaction-Enabling System Hereof As illustrated in FIG. 1, the first preferred (particular) embodiment of the Internet-based Transaction-Enabling System hereof 3 is realized in the form of a desktop computer system 6. As shown, the desktop computer system consists of a video monitor 6A, a processor 6B, keyboard 6C, mouse 6C, and Postscript® laser printer 35, and is connected to the Internet by way of an ISP 4. The computer system 6 has a GUI-based web browser program and a hand-held, wireless laser scanning bar code symbol reading system 7 which is connected to the communication port of this host system in a conventional manner. In the preferred embodiment, wireless bar code symbol reading system 7 comprises a hand-supportable laser scanning bar code symbol reading device 7A and a base unit 7B which receives RF signals transmitted from device 7A upon the successful reading of each bar code symbol thereby; the base unit 7B produces an acoustical acknowledgement signal in response to each such successful read. System 7 can be realized by any one of the (i) wireless bar code symbol reading systems disclosed in copending application Ser. No. 08/292,237 filed Aug. 17, 1994, or (ii) tethered bar code symbol reading systems disclosed in copending application Ser. Nos. 08/476,069 and 08/660,643, each said application being incorporated herein by reference.

While the operation of programmed bar code symbol reader 7 will differ slightly depending on which generalized Internet Access Method is used, the functions which it carries out will be generally the same, namely: to read a bar code symbol 8 that is encoded with either the URL or DN/PN of a Web-page to be accessed by the Internet-based Transaction-Enabling System; and produce symbol character data representative of the URL or DN/PN character string for use by the Internet browser program of its associated Internet Terminal.

As used hereinafter, these special types of encoded bar code symbols shall be generally referred to as "URL-encoded bar code symbols", regardless of whether the complete URL or only a portion thereof (e.g., DN or DN/PN) is encoded within the bar code symbol structure. Similarly, mag-stripe structures encoded with a URL or DN/PN character string, as described hereinbelow, shall be generally referred to as "URL-encoded mag-stripes" regardless of whether the complete URL or only a portion thereof (e.g., DN or DN/PN) is encoded within the magnetic stripe symbol structure. Collectively, these structures shall be referred to as "URL-encoded symbols" regardless of whether the complete URL or only a portion thereof (e.g., DN or DN/PN) is encoded within the symbol structure.

In the case of where either the first, second or third generalized Internet access method described above is employed, the Internet Transaction-Enabling Terminal (realized by desktop computer system 6) can provide Internet access support by running any conventional GUI-based Internet browser program, such as the Navigator® from Netscape or the Internet Explorer® from Microsoft.

In the case of where the fourth generalized Internet access method of FIG. 1E is used, conventional browser programs of the type mentioned above must be provided with a Plug-in Module (e.g., browser subprogram) that can be readily written and installed within the browser program. The function of such a Plug-In Module is to: (i) automatically read scanned-URL information that is stored within an addressed data buffer at the I/O port of the client computer platform 6 (supporting the Internet Terminal); (ii) automatically write the URL information (in an appropriate format) to the data buffer assigned to the "Goto" window 40A of the Internet browser display screen 40 (shown in FIG. 4); and then (iii) automatically initiate HTTP over the Internet to connect to the associated Internet Server and access and display the transaction-enabling Web-page located at the entered URL. In such embodiments, it is preferred that each Internet-based Transaction-Enabling System has a preloaded Internet browser program provided with the above-described Plug-In Module, or the functionalities provided thereby. It is understood, however, that in some instances it may be desirable to distribute or download the browser program and plug-in module to client computer systems from an Internet-based Information Server on the WWW using the well known file transmission protocol (FTP). In this way, conventional client computer systems can be easily converted into Internet-based Transaction-Enabling Systems according to the present invention.

In the preferred embodiments of the invention, the bar code symbol reading system 7 is a laser scanning bar code symbol reader (e.g., a Metrologic Scanner MS951-48 with keyboard wedge) which is connected to the data-input port of the client computer platform 6. When used to read a URL-encoded bar code symbol, the URL is automatically entered as input into the "Goto" window of the Internet browser program, and, by way of HTTP, the particular transaction-enabling HTML document (ie., Web-page) corresponding to the URL is automatically accessed by the Internet-based Transaction-Enabling System for display on visual display terminal 6A in a manner well known in the art.

As mentioned hereinabove, each URL-encoded bar code symbol of the present invention can be either a linear (1-D) or 2-D bar code symbol structure of virtually any symbology that allows for the encoding of the (ASCII-type) information contained within a URL-type information structure, the syntax of which is well known in the art. In the preferred embodiment, the URL-encoded bar code symbol 8 is realized as a truncated-type bar code symbol constructed using any one of the following bar code symbologies: Code 128; full ASCII character set of Code 39; and Code 93. While the URL-encoded bar code symbol can be of any length, practical considerations will typically dictate which encoding technique should be used in any particular application. Notably, the advantage of using the truncated bar code symbol structure is that the height of the bars and spaces is relatively short in relation to the length of the bar code, thus allowing the URL-encoded truncated symbol 8 to be easily printed on transaction cards, or on pages of printed Web-site transaction guides and catalogues, as illustrated in FIG. 1A.

As shown in FIGS. 1 and 1A, the programmed bar code symbol scanner 7 of the Internet-based Transaction-Enabling System of the first preferred embodiment is particularly designed so that closely nested URL-encoded bar code symbols printed on a single page can be read without inadvertently reading undesired URL-encoded bar code symbols. This added scanning control feature is achieved in the bar code symbol reader of FIG. 1 by providing the automatic laser scanning bar code symbol reader 7A with an optically-transparent scanning plate 9A supported from reader 7A by an optically transparent extension 9B. The scanning plate 9A has formed therein a sighting window (i.e., aperture) 10, through which a URL-encoded bar code symbol 8 is automatically scanned and read when such a printed symbol (on a substrate) is aligned with the sighting aperture. In this particular embodiment, the IR-based object detection field 11 of bar code symbol reader 7A extends just slightly beyond the sighting window 10 so that laser scanning by laser beam 12 is automatically initiated only when an object (e.g., Web-site guide) 13 is placed up against the sighting window 10, as when the scanning plate is brought in contact with URL-encoded bar code symbol 8 associated with a particular transaction-enabling Web page, shown in FIG. 1A. The design and construction details associated with automatic bar code symbol reader 7A can be found in Applicant's prior U.S. application Ser. No. 08/292,237 filed Aug. 17, 1994, incorporated herein by reference. As shown in FIG. 1, this scanning device can be provided with a keypad 15 in a manner known in the art, for manually entering the characters of URLs, as needed or required.

As discussed above in connection with FIG. 1H, it may be desirable to encode the URL of a particular information resource within two or more moderate-length bar code symbols, instead of within a single long-length bar code symbol. This will allow the use of shorter length bar code symbols on printed menus and lists. In such applications, the primary (i.e., base) portion of the URL (e.g., "http://www.metrologic.com") identifying the location of the Web Server can be encoded within a first bar code symbol, whereas the auxiliary (i.e., extension) portion of the URL (e.g., "/products/MS6720.html") indicating the location of the information resource (i.e., transaction-enabling Web page) relative to the identified Web Server can be encoded with a second bar code symbol. With this technique, access to such a transaction-enabling Web page can be achieved in a two-step process, namely: (1) scan the first bar code symbol to access the home page of the Web Server located by "http://www.metrologic.com"; and (2) scan the second bar code symbol to access the transaction-enabling HTML document located by "Products/MS6720/.html". Preferably, the base (i.e., primary) and auxiliary segments of the URL would be printed below the first and second bar code symbols respectively, as shown in FIG. 1H. This composite bar code symbol structure can be used during the menu composition process of the present invention as described in detail hereinabove.

Figure 2:
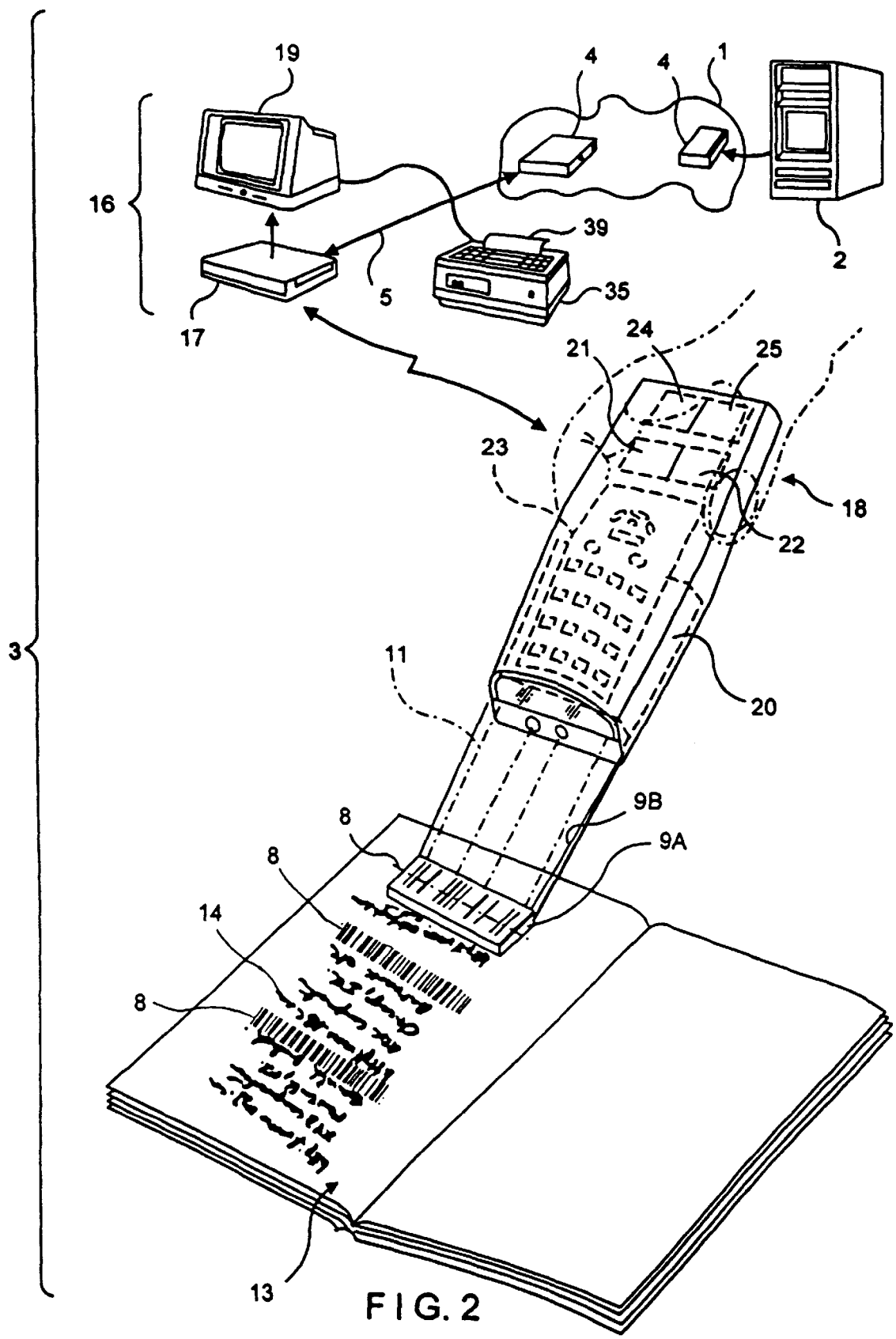
FIG. 2 is a schematic diagram of the second preferred embodiment of the present invention, in which the Internet-based Transaction-Enabling System hereof is realized in the form of an interactive Web-based television system which comprises a Terminal Unit shown connected to the Internet by way of an ISP and has portable Internet Navigation (i.e., surfing) Device having an IR-link to the Terminal Unit, and a bar code symbol scanner integrated therewith for automatically accessing Applet-encoded Web pages by simply scanning corresponding URL-encoded bar code symbols printed on various types of media.

Second Preferred Embodiment Of The Internet-based Transaction-Enabling System Hereof As illustrated in FIG. 2, the second preferred embodiment of the Internet-based Transaction-Enabling System hereof is realized in the form of an interactive Web-based television system 16. Any of the generalized Internet access methods described hereinabove can be used to carry out this particular embodiment of the present invention.

As shown, interactive web-based television system 16 comprises an Internet Terminal Unit 17, a Remote Control Scanning Device 18 and a standard (NTSC or PAL) color television set 19. As shown, the Internet Terminal Unit 17 is connected to the Internet by way of an ISP 4 and includes means for supporting: (i) a GUI-based Internet browser program such as the Internet Navigator® from Netscape Communications or the Internet Explorer® from Microsoft, Inc.; and (ii) the TCP/IP networking protocol on the Internet. In the preferred embodiment, the Internet Terminal Unit 17 can be realized using any one of a number of commercially available Internet Terminal devices, such as, for example:

the Mediamaster 9500™ Internet Terminal from Nokia, Inc.; the NetStation™ Internet Terminal from Acorn Computer; or the "Internet Digital Appliance" from Diba.

As shown in FIG. 2, the Remote Control Scanning Device 18 of the second preferred embodiment can be realized by integrating a miniature automatic bar code symbol reading module 20 into the wireless remote control device that is provided with the commercially available terminal unit that is used to practice this embodiment of the present invention. Preferably, automatic bar code symbol reading module 20 is similar to the device described in great detail in Applicant's copending application Ser. No. 08/292,237 supra. Such laser scanning engines, as they are called, are commercially available from Metrologic Instruments, Inc., of Blackwood, N.J., under the tradename ScanQuest®. The manner in which such a laser scanning engine can be integrated into any one of the remote control devices of the above-identified Internet Terminals, and thus provide the Remote Control Scanning Device 18, will be described below.

The Mediamaster 9500™ Internet Terminal from Nokia, Inc., the NetStation™ Internet Terminal from Acorn Computer, or the Internet Digital Appliance from Diba, are each provide with a wireless remote control device which includes a programmable microcontroller (i.e., microprocessor) operably connected to a system bus of one sort or another. The system subcomponents that are connected to this system bus structure include, for example: program memory realized in the form of EPROM 21; data storage memory realized in the form of RAM 22; a keypad 23, data storage registers and interface circuitry; an IR-based communication circuit and interface circuitry 24; and a power supply and power distribution circuitry 25. In such commercial products, no visual display device (e.g., LCD panel) is provided, as all display functions are provided on the television screen using an on-screen display format well known in the art. Integration of an automatic ScanQuest® Laser Scanning Module (Model No. IS4120) into the system architecture of such wireless remote control devices can be achieved by adding additional data registers to the system bus, and connecting the data output port of the scanner to such registers in a conventional manner. Additional control logic will have to be provided by the microcontroller in to provide scan data from the scanner to have priority over data entered manually into the system. All such modifications are within the ordinary skill in the art.

As shown in FIG. 2, Remote Control Scanning Device 18 has an optically-transparent scanning plate 9A supported by an optically transparent extension 9B. The scanning p late 9A has formed therein a sighting window (i.e., aperture) 10, through which a URL-encoded bar code symbol 8 is automatically scanned and read when such a printed symbol (on a substrate) is aligned with the sighting aperture. The IR-based object detection field 11 extends just slightly beyond the sighting window 10 so that the laser scanning beam 12 is automatically initiated only when an object (e.g., transaction cord or guide) 13 is placed up against the sighting window 10, as when the scanning plate 10 is brought in contact with URL-encoded bar code symbol 8 associated with a particular transaction enabling Web-page, shown in FIG. 2. During operation, the Remote Control Scanning Device 18 is used to read URL-encoded bar code symbols 8 printed on Internet Transaction Guide 13 in order to connect to the corresponding transaction-enabling Web pages.

While any standard (NTSC or PAL) color television set can be used in connection with the Internet Terminal 17 to display graphical and audio information content associated with any particular Web-site accessed by the system, it is preferred that a higher-resolution (VGA or SVGA) computer monitor is used in connection therewith to display high resolution graphics.

Figure 3:
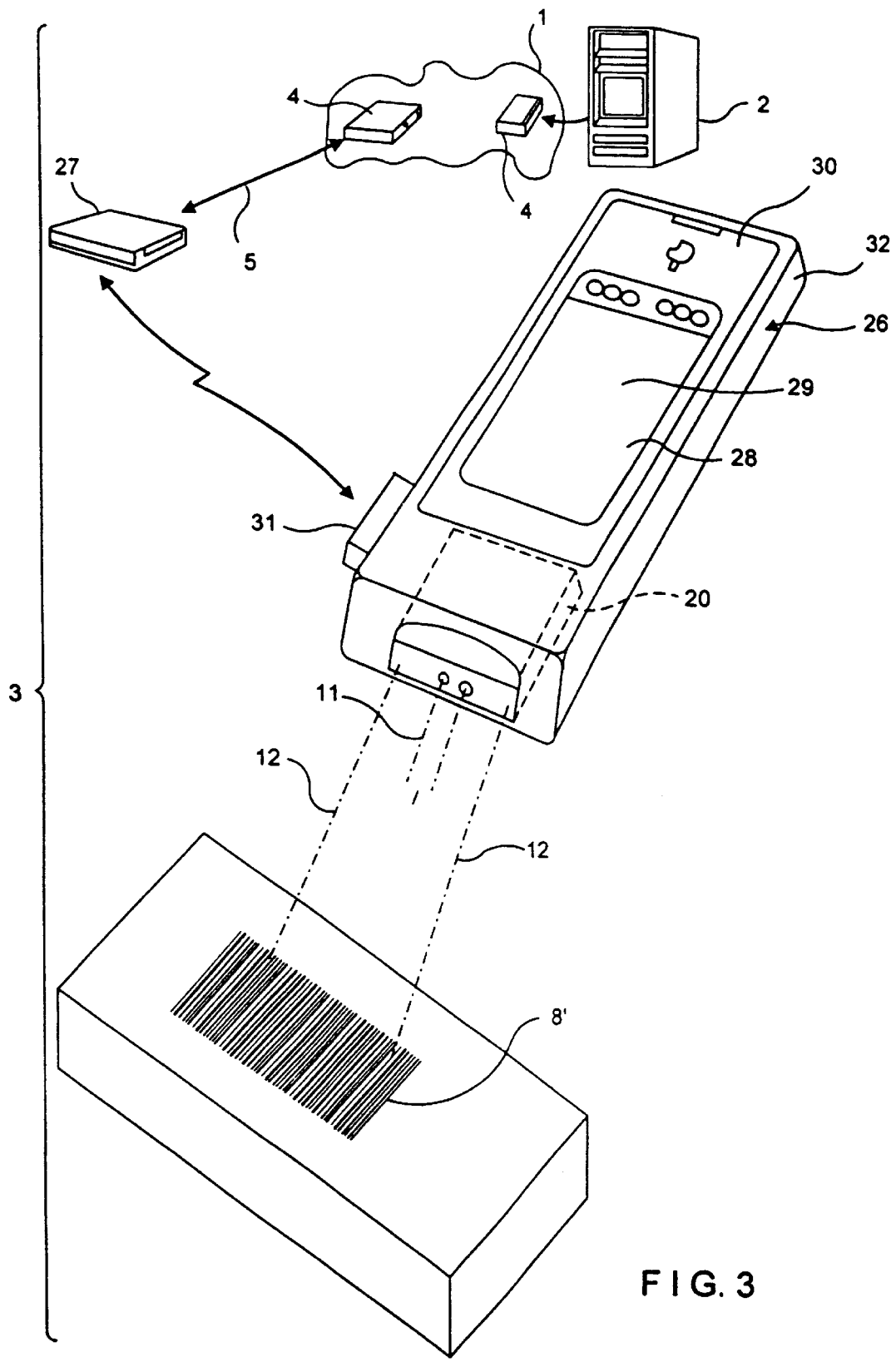
FIG. 3 is a schematic diagram of the third preferred embodiment of the present invention, in which the Internet-based Transaction-Enabling System hereof is realized in the form of a hand-held Scanner Terminal shown connected to the Internet by way of a wireless link to an ISP, and having an integrated GUI-based web browser program, display panel, keypad, and programmed bar code symbol scanner for automatically accessing Applet-containing Web pages listed in a transaction guide by simply scanning corresponding URL-encoded bar code symbols printed on the pages thereof.

Third Preferred Embodiment Of The Internet-based Transaction-Enabling System Hereof As shown in FIG. 3, the third preferred embodiment of the Internet-based Transaction-Enabling System hereof is realized in the form of a hand-held Integrated scanning Terminal 26. Any of the generalized Internet access methods described herein can be used to carry out this particular embodiment of the present invention. The Internet Scanner Terminal 26 is shown connected to an ISP 4 by way of a radio-base station 27 and wireless link 5. The hand-held Internet Scanning Terminal 26 has an integrated GUI-based web browser program, display panel 28, touch-screen type keypad 29, and programmed bar code symbol scanner 20. The function of bar code symbol scanner 20 is to read a bar code symbol 8 that is encoded with the URL of a transaction enabling Web page to be accessed by the Internet-based Transaction-Enabling System, and produce symbol character data representative thereof.

In the illustrative embodiment, the Internet Scanner Terminal 26 is realized as a transportable computer, such as the Newton® Model 130 Messagepad 30 from Apple Computer, Inc. of Cupertino, Calif. This device is provided with NetHopper™ brand Internet Access Software from which supports the TCP/IP networking protocol within the Newton MessagePad operating system. The Newton Messagepad is also equipped with a Motorola PCMICA-based modem card 31 having a RF transceiver for establishing a wireless digital communication link with either (i) a cellular base station, or (ii) one or more satellite-base stations (27) connected to the Internet by way of an ISP 4 in a manner well known in the global information networking art. While it is understood that, in some instances, it may be desired to connect a pen or wand device to the serial port of the Newton MessagePad to provide bar code symbol reading capabilities thereto, it is generally preferred that automatic laser scanning engine 20 (e.g., Metrologic ScanQuest® Laser Scanning Module Model No. IS4120), be interfaced with the serial communications port of the Newton MessagePad so as to realize the Internet-based Transaction-Enabling System of the third preferred embodiment hereof.

As shown in FIG. 3, the entire Newton MessagePad, ScanQuest® Laser Scanning Module 20 and auxiliary battery supply (not shown) are completely housed within a rubberized shock-proof housing 32, in order to provide a hand-supportable unitary device. Once the object (e.g., transaction card) 13 is detected by the object detection field 11, a laser beam 12 is automatically projected and swept across the URL-encoded symbol 13 thereon.

Optionally, in each of the three particular embodiments of the Internet-based Transaction-Enabling System described above, the bar code symbol scanner can be replaced by a programmed optical character reader realized using, for example, the automatic holographic laser scanning technology disclosed in great detail in Applicant's copending application Ser. No. 08/573,949 filed Dec. 18, 1995, incorporated herein by reference. The function of the programmed optical character reader is to allow the Internet Access Terminal to access any transaction-enabling Web page by optically scanning the alphanumeric character string comprising the URL thereof, and provide the same as output to the "Goto" Window of the GUI-based Internet browser program thereof. In such alternative embodiments, the function of the optical character reader (i.e., character reading module) is to read the ASCII characters comprising the URL (and other encoded information) 14 printed on an object (e.g., transaction card, keychain, pen, pencil, bookmarker, guide, etc.) avoiding the need for manual key entry operations.

Fourth Preferred Embodiment Of The Internet-based Transaction-Enabling System Hereof In the above-illustrative embodiments, the bar code symbol reading device has been either supported within the hand of the operator, upon a countertop surface or the like. It is contemplated, however, that the bar code symbol reader and other client-side components of the Internet-based Transaction-Enabling System hereof can be worn on the body of its operator as illustrated in FIGS. 4 and 5.

Figure 4:
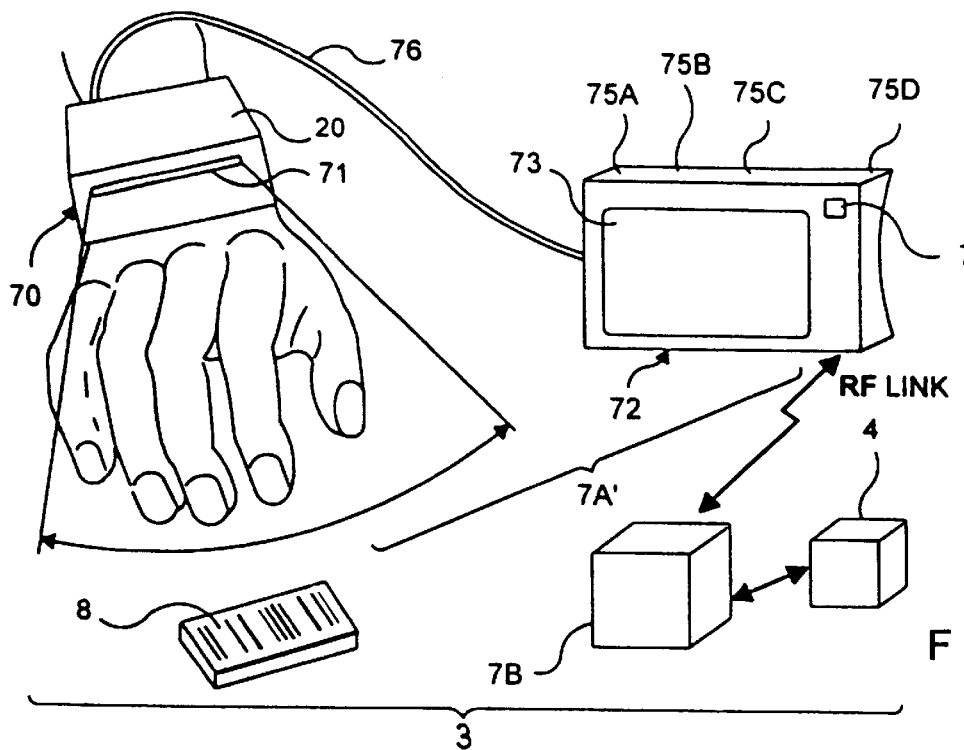
FIG. 4 is a schematic representation of the fourth illustrative embodiment of the present invention in the form of a body-wearable bar code symbol driven Internet-based Transaction-Enabling System having a hand-mounted bar code symbol reader and a forearm mounted remote unit containing a microcomputing system for supporting Internet access of Applet-embedded Web pages by reading URL-encoded symbols.
Figure 5:
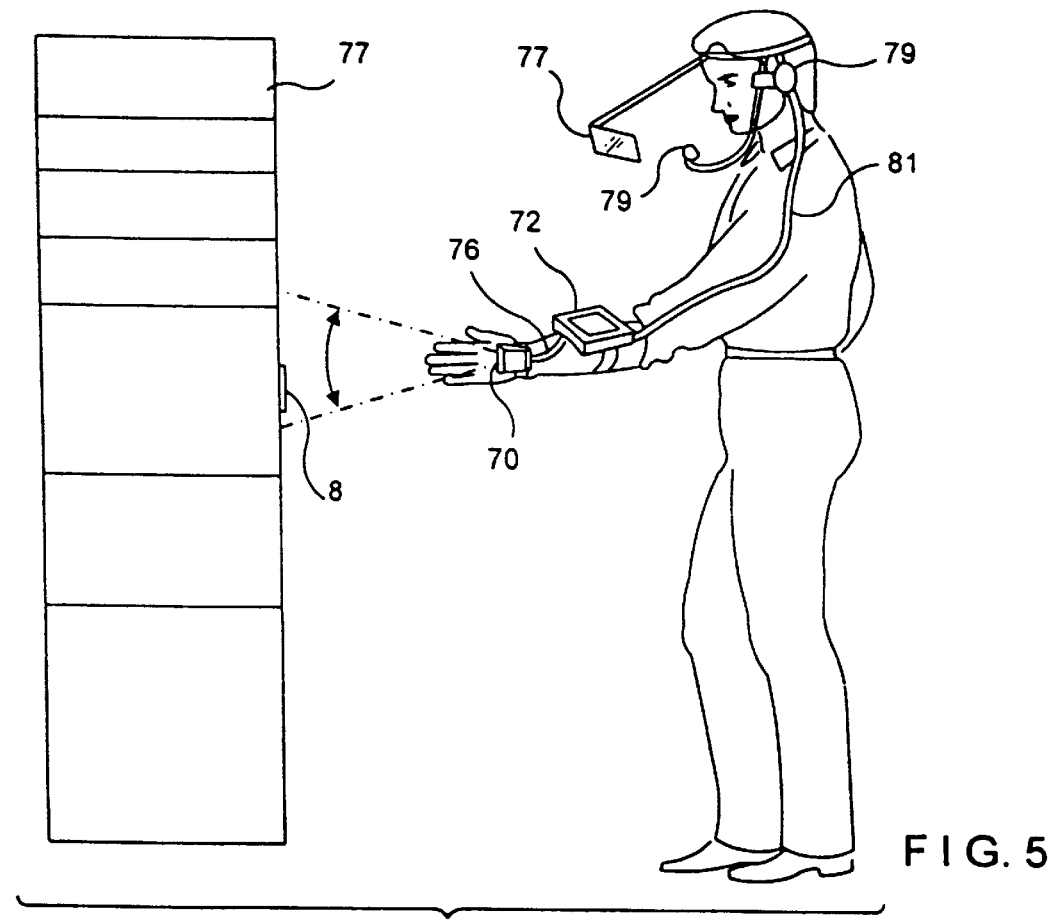
FIG. 5 is a schematic representation showing the body-wearable system of FIG. 5 being used to access information resources (e.g., audio and video information) from an Internet-enabled database during inspection and/or repair of a system or plant in accordance with the principles of the present invention.

As shown in FIG. 4, the body-wearable Internet-based Transaction-Enabling System of the present invention comprises: a bar code symbol scanning unit 70 designed to be worn on the back of the hand; and a remote unit 72 (i.e., body-wearable RF-based Internet access terminal) designed to be worn about the forearm or foreleg of the operator by fastening thereto using flexible straps or like fastening technology.

In the illustrative embodiment, hand-mounted scanning unit 70 comprises: a light transmission window 71 for exit and entry of light used to scan bar code symbols; a glove 70A worn by the operator for releasably mounting housing 70 to the back of his or her hand; and a laser scanning bar code symbol reader 20, as described hereinabove with respect to the other illustrative embodiments of the present invention. In other embodiments, other optical scanning devices may be used in lieu of unit 20 provided the depth of scanning provided thereto is satisfactory for the intended application.

In the illustrative embodiment, the remote unit 72 comprises: an LCD touch-screen type panel 73; an audio-speaker 74; a RISC-based microcomputing system or platform 75A for supporting various computing functions including, for example, TCP/IP, HTTP, and other Internet protocols (e.g., E-mail, FTP, etc.) associated with the use of an Internet browser or communicator program (e.g., Netscape Navigator or Communicator, or MicroSoft Explorer programs) provided by the remote unit; a telecommunication modem 75B interfaced with the microcomputing system; an RF transceiver 75C (e.g., employing DFSK or spread-spectrum modulation techniques) also interfaced with the telecommunication modem for supporting a 2-way telecommunication protocol (e.g., PPP) known in the art, between the microcomputing system and a remote transceiver 7B (described hereinabove) which is interfaced with ISP 4 connected to the Internet; a (rechargeable) battery power supply 75D aboard the remote housing, for providing electrical power to the components therein as well as to the bar code symbol reader 20; and a flexible cable 76, for supporting communication between the bar code symbol reader 20 and the microcomputing platform, and electrical power transfer from the power supply to the bar code symbol reader. Notably, the remote unit 72 will embody one of the Internet access methods described hereinabove. The method used by remote unit 72 (i.e., Internet access terminal) will depend on the information that is encoded within the URL-Encoded bar code symbol scanned by the bar code symbol reader thereof 20.

Optionally, a laser scanning bar code symbol scanner (without a digitizer or decoder) 20' can be contained within hand-mounted unit 70, and the necessary digitizing and scan-data processing can be carried out by the microcomputing system within the remote unit 72 using techniques well known in the art, or using special-purpose ASIC-type devices contained within remote unit 72 also well known in the art. Such construction techniques will allow the bar code scanning unit to be miniaturized small enough to be worn on the operator's finger, in a manner well known in the art. Preferably, activation of the bar code symbol scanning/reading unit is automatically controlled as taught in Applicant's prior U.S. Applications, incorporated herein by reference, but may where suitable be manually activated using a trigger switch or like device mounted on hand-supported unit 70 or elsewhere within the configuration of the system.

Preferably, the remote unit 72 is worn on the forearm of the operator so that the touch-type LCD panel 73 integrated therewith can be easily viewed during use of the body-wearable system of the present invention. Thus, when an URL-encoded bar code symbol is read by the hand-mounted (or finger-mounted) bar code symbol reader 20, the transaction-enabling Web page associated with the scanned bar code symbol and displayed on the LCD panel can be easily viewed and interacted with by the operator. Also, in response to reading an URL-encoded bar code symbol (i.e., transaction enabled thereby), the operator may be required to manually enter information to the Web page being displayed, using the touch-screen display panel 73 and pen-computing software, well known in the art.

In alternative embodiment of the present invention, a large-vocabulary speech recognition subsystem may be integrated within the remote housing 42 so that the user can enter information to the Internet browser by speaking rather than through manual keystroke, or pen computing techniques well known in the art and supported by the microcomputing platform contained within the remote housing.

In some applications, it may also be desirable to mount the bar code symbol reader 20 on the finger or head of the operator and/or mount the remote housing 72 on a different portion of the operator's body (e.g., leg or waist). It may also be desirable to integrated all of the components of the system into a single housing worn on a specific portion of the operator's body.

In some applications, it may be desirable to provide a lightweight headset having a miniature LCD display screen 77, a microphone 78, and earphones 79, while providing the remote unit 72 with audio and video input/output ports 80 for supplying audio input to the microcomputing platform (within the remote unit) and audio and video output therefrom for driving the headset worn by the operator during in-field use of the system, using a flexible communication cable 81, as shown in FIGS. 4 and 5. The function of the head-supported microphone 78 would be to provide speech input to the microcomputing system for processing by a speech recognition subsystem realized thereaboard using commercially available speech-recognition software (e.g., from Dragon Systems, Inc. Newton Mass.). The function of the head-mounted video-panel 77 would be to provide a convenient way of displaying HTML-encoded information pages accessed from the Internet in response to reading URL-encoded bar code symbols using bar coded symbol reader 20. The function of the earphones 79 would be to provide a convenient way of supplying audio information encoded within HTML-encoded information pages accessed from the Internet in response to reading URL-encoded bar code symbols using bar coded symbol reader 20. Such auxiliary devices 77, 78 and 79, interfaced with the forearm-supported Internet-terminal 72, will provide the operator with additional freedom to carry out his or her operations.

Fifth Preferred Embodiment Of The Internet-based Transaction-Enabling System Hereof In FIG. 6, a fifth illustrative embodiment of the Internet-based Transaction-Enabling System hereof is illustrated. As shown, this system is realized in the form of an Internet-based kiosk 82 comprising: an housing 83 for installation in a public location (e.g., retail store, shopping center or mall, bus terminal, airport, hotel lobby, restaurant, beach pavilion, sportscenter, or the like) 84; a thin-client computing platform (e.g., thin-client network computer from Sun Microsystems, Inc.) 85 in the housing 83 and running a Java-enabled Internet browser program (eg., HotJava™ browser program, or Netscape 3.0 browser program); a touch-screen type color LCD panel 86 for displaying Web pages and manually entering information to the browser program by way of touch screen operations; audio-speakers 87 for producing audio output from the Java-enabled browser program; a magnetic stripe card scanner 88 (e.g., Mag-Tek® magnetic stripe reader from Magtek, of Carson, Calif.) mounted external to the housing and a mag-stripe decoder 89 (e.g., the OMNILINK® Decoder from Symbol Technologies, or programmed microprocessor) mounted within the housing and interfaced with the data input port of the computing platform; and a 2-D bar code symbol reader 90 interfaced with the data input port of the computing platform.

The function of the magnetic stripe reader 89 is to read URL-encoded magnetic strips (i.e., "mag-stripes") 91 formed on credit cards and other types of transaction cards 92, as shown in FIG. 6A. In the preferred embodiment of the present invention, the URL or DN/PN character string of a particular transaction-enabling HTML-encoded document (i.e., Web page) is encoded along the "first" (alphanumeric) data track of a ANSI/ISO standard mag-stripe shown in FIG. 6A, using the ANSI/ISO ALPHA Data Format standard well known in the mag-stripe art. At the bit level, actual data encoding will be carried out using the hexadecimal code well known in the art, and thus the ANSI/ISO ALPHA Data Format will be expressed in terms of the hexadecimal code and therefore can be interpreted in straightforward manner during decoding operations. Notably, while the ANSI/ISO ALPHA Data Format is preferred because it enables the encoding of the alphanumeric characters comprising virtually all URLs, or the DN/PN subcomponents thereof, it is understood that other suitable encoding/decoding schemes can be used without departing from the scope or spirit of the present invention.

Optionally, other types of information can be encoded within the transaction-enabling mag-stripe card of the present invention so as to carry out transaction-access authorization, and other security functions known in the art (e.g., expiration date control, etc.). For example, expiration-data control can be carried out by encoding certain bits along a particular data track of the mag-stripe to represent the expiration date of the transaction-enabling card. Restricted-user control can be carried out by (1) encoding certain bits along a particular data track of the mag-stripe to encode a personal identification code for access by the HTTP server hosting the transaction-enabling HTML document, and (2) requiring the user to manually enter a preassigned access code when the transaction "home" Web page is displayed, thereby completing the security protocol established by the transaction service provider. Notably, such security techniques can be carried out using URL-encoded (1-D and 2-D) bar code symbols in a manner similar to that described hereinabove.

In the illustrative embodiment of the present invention, the mag-stripe decoder 89 (e.g., an OMNILINK® Decoder) is programmed to decode the ANSI/ISO ALPHA Data Format. Also, in those applications where a conventional Web browser program is to be used (without a plug-in module for handling input URL strings provided from code symbol readers), it will be necessary to program the mag-stripe decoder 89 to automatically insert prefix program command RTN) into the character data output string produced by the programmed decoder, as disclosed in detail hereinabove. The output from the programmed decoder 89 can be directly provided to the data input port (e.g., RS232) of the thin-client computer system 85. Alternatively, where a keyboard is used instead of touch-screen display panel 86, the output from the programmed decoder 89 can be first encoded into the keyboard data format and then provided to the computer system through its keyboard data input port.

With this system configuration, the URL of a transaction-enabling Web page is encoded along the first (alphanumeric) data track of an ANSI/ISO mag-stripe card 92, and the transaction-enabling Web page is embedded with a Java-Applet designed to enable a particular type of information-related transaction over the Internet (e.g., financial transactions, ticket purchases, information purchases, product purchases, service procurements, securities trading, etc.). Then when the URL-encoded mag-stripe is read by the mag-stripe reader 88 of the Internet-enabled kiosk 82, the transaction-enabling Web page located at the decoded URL is automatically served to the requesting Web browser and displayed on the LCD panel 86. In one embodiment, a graphical icon would be displayed on the Web page indicating that the customer or consumer press or touch the displayed icon to automatically launch the underlying Java-Applet to initiate the solicited transaction. In a conventional manner, the customer would simply follow the display screens and instruction provided thereby which will be specified in accordance with the Java-Applet embedded within the launched Web page (i.e., HTML-encoded document). The type of transaction supported over the Web browser is dependent only on upon the needs and desires of the transaction service provider. While common types of transactions which can be enabled using the method and system of the present invention will typically relate to subjects such as finance, account management, product purchase; service procurement, ticket purchase, information acquisition, it is understood that a multitude of other subject areas, hitherto unthought of, will benefit from the present invention.

Modifications To The Illustrative Embodiments Of The Internet-Based Transaction-Enabling Systems Of The Present Invention Instead of using a laser scanning module to construct the Internet Access Terminals of the present invention shown in FIGS. 1, 2, 3, 4, and 6, one may use CCD-type bar code scanning engines (or modules) employing LEDs to illuminate bar code symbols in the scan field, and CCD-type linear or array devices for capturing images thereof for subsequent decode processing. Examples of CCD scanning modules that can be used to construct CCD-based Internet Access Terminals according to the present invention can be found in the following U.S. Pat. Nos.: 5,550,366; 5,354,977; 5,291,009; 5,484,994; 5,349,172; and 5,532,467; each being incorporated herein by reference in its entirety.

As mentioned above, the present invention contemplates using encoding URL (or DN/PN) information within 2-D bar code symbols as schematically illustrated in FIG. 1F. In such instances, one would provide a 2-D bar code symbol reading engine (or device) within each Internet-based Transaction-Enabling System of the present invention so that to the URL information encoded within 2-D bar code symbols can be optically scanned and decoded using the appropriate 2-D bar code decoding algorithm. Examples of 2-D (laser scanning) bar code symbol reading devices that can be used to construct "2-D type" Internet-based Transaction-Enabling Systems according to the principles of the present invention are disclosed in the following U.S. Pat. Nos.: 5,594,232; 5,523, 552; 5,504,316; 5,414,250; 5,373,148; 5,319,181; each being incorporated herein by reference in its entirety. In other embodiments of the present invention, one may employ scanning modules capable of reading both 1-D and 2-D type bar code symbols.

Universal Transaction-Enabling Method Of The Present Invention

Having described various illustrative embodiments of the Internet-based Transaction-Enabling Systems of the present invention, it is now appropriate to describe how such systems can be used to carry out information-related transactions over the Internet using URL-encoded symbols and Web Pages embedded with transaction-enabling Java-Applets.

Figure 7:
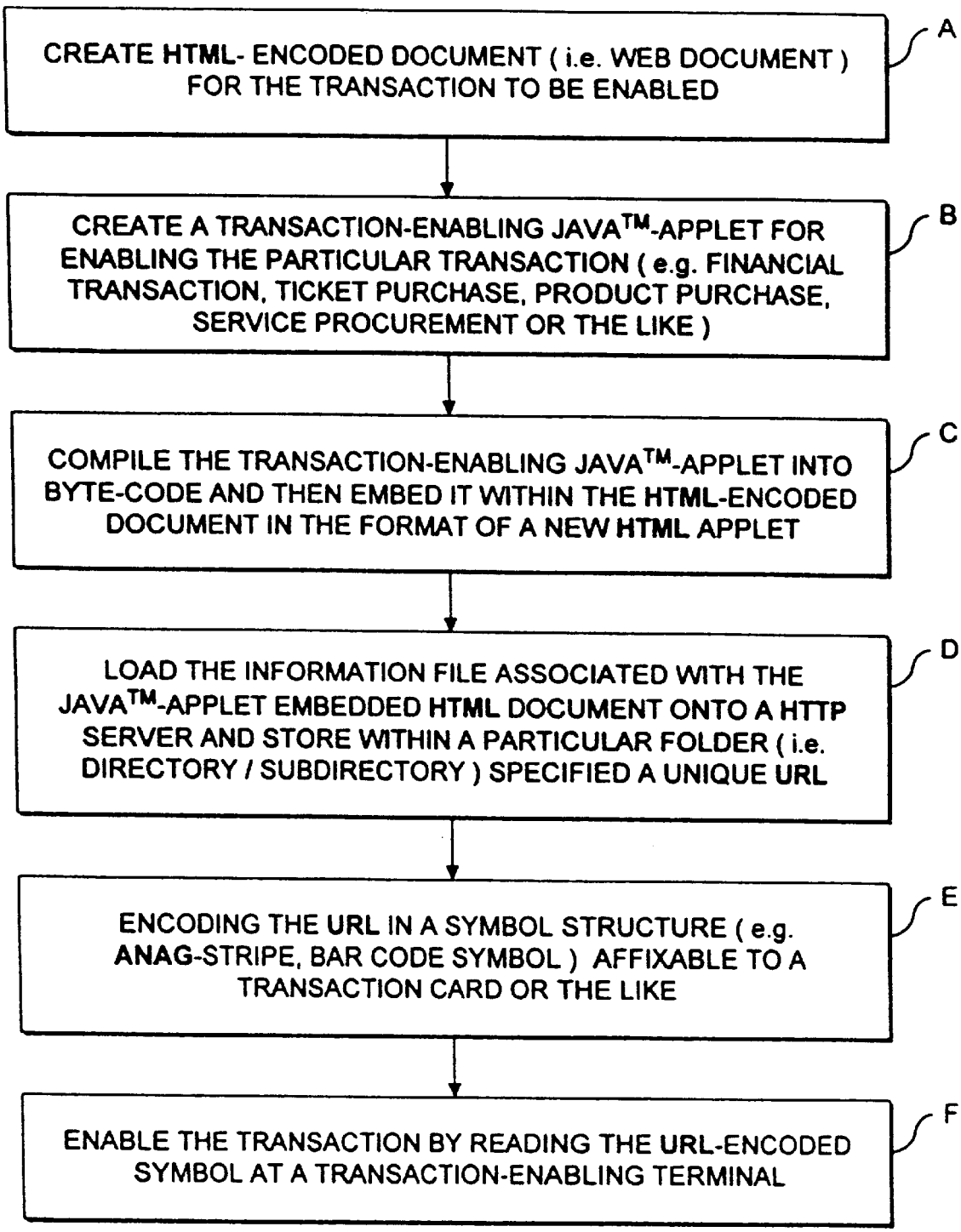
FIG. 7 is a flow chart setting forth the steps involved in practicing the transaction-enabling method of the present invention over the Internet.

In connection therewith, reference shall be made to FIG. 7, wherein the flow chart illustrated therein sets forth the steps involved in practicing the Transaction-Enabling Methodology hereof over the Internet.

As illustrated at Block A in FIG. 7, the method involves creating a Web document (i.e., HTML-encoded document) which shall function as the "Server" for the transaction to be enabled over the Internet. This Web document can be created using commercially available HTML-editing and/or Web-page development tools (e.g., Page Mill 2.0 from Adobe, Inc.) well known in the art. Preferably, the Web document will be designed to carry out the marketing objectives of the information-related service that is to be delivered to the customer, consumer or client accessing this Web page. Optionally, this Web page may also contain hot-links to other Web pages that relate somehow to the information-related transaction to be enabled or service to be provided.

As indicated at Block B of FIG. 7, a transaction-enabling Java™-Applet or set thereof are then created using Java-Applet application programming interfaces (APIs) and development tools (e.g., JavaScript™ authoring tool, Jamba™ software authoring tool, and/or Java Beans™ software authoring tool) well known in the programming art. The function of each transaction-enabling Java-Applet is to enable a particular information-related transaction (e.g., financial transaction; ticket purchase; information purchase; product purchase; service procurement; and the like). Preferably, each transaction-enabling Applet will be designed to produce easy to follow information display screens at the client-side of the system, which can be followed by users having very little (if any) computing or Internet-browsing skills. During the transaction design process, various considerations should be accorded to the sequential flow of the information display screens, queries and choices presented therein, decision-loop structures, and the like.

Then, as indicated at Block C in FIG. 7, each transaction-enabling Java-Applet(s) is compiled into bytecode and then embedded within the previously created HTML document in the form of a new HTML APPLET. The Applet element adheres to the following general syntax (note that [ ] identifies optional parameters):

```
<APPLET
    [CODEBASE = codebaseURL]
    CODE - appletFile
    [ALT = alternateText]
    [NAME = appletInstanceName]
    WIDTH = pixels HEIGHT = pixels
    [ALIGN = alignment]
    [VSPACE = pixels] [HSPACE = pixels]
>
    [<PARAM NAME = Attribute1 VALUE = value >]
    [<PARAM NAME = Attribute2 VALUE = value >]
    . . .
    [alternateHTML]
</APPLET>
```

The optional <PARAM> tag lets you to specify applet-specific attributes that your applet can retrieve as Strings. These Strings can be used in an HTML document to customize the Applet's behavior and supply their respective values lie command-line variables.

CODEBASE, CODE, WIDTH, and HEIGHT are parameters specified by the first part of the APPLET tag. The Java-enabled Web browser uses these parameters to locate the Applet code on the hosting HTTP server and to reserve space in the HTML document display. CODEBASE directs the Java-enabled Web browser to look for code in the classes directory associated with the HTML document's URL. CODE provides the name of the Java code file that is to be loaded from the hosting HTTP server. Any other class files used by the Applet are loaded from the Codebase Directory as well. CODEBASE is an optional parameter; if it is not specified, the Java-enabled Web browser looks for class files in the HTML document's directory. It is important that the use of upper/lower case in both the class name and the filename are identical.

WIDTH and HEIGHT are parameters that tell the Java-enabled Web browser to reserve space in the document display before the Java code is loaded ("x" pixels wide by "x" pixels high), similar to the way browsers deal with images, reserving space before the complete image is available. To place an invisible Applet on a page, specify height and width of zero.

Current Java-enabled Web browsers ignore the Java language resize( ) method for applets. Although the applet viewer provided in the JDK responds to the resize() method, one will have to specify width and height correctly in the APPLET tag for general Web browsers.

VSPACE and HSPACE are optional parameters for specifying the amount of space (in pixels) that surrounds the Applet above and below (vspace) and on each side (hspace) of the Applet area. Notably, the Netscape 2.0 browser appears to ignore these parameters.

ALIGN is another optional parameter and is used to designate where the Java-enabled Web browser is to place the Applet area in relation to any other design elements. ALIGN can have possible values like those for the IMG tag: left, right, top, texttop, middle, absmiddle, baseline, bottom, and absbottom. The Netscape 2.0 browser does not support these parameters correctly, so try removing the ALIGN parameter if the desired results from the transaction enabling Applet are not obtained.

The ALT parameter designates a string to be displayed if the browser understands the <APPLET> tag but does not have Java capabilities. Netscape 2.0 allows turning the Java interpreter on or off via a check box under Options on the Security Preferences menu. The ALT parameter is a way to remind users to turn Java back on after turning it off to avoid wasting time on slow applets (as can often occur on Web pages).

Applets that coexist on a transaction-enabling Web page communicate by means of the NAME parameter. The AppletContext method getApplet (String name) returns a reference to the named Applet if it can be found in the Web page and then allows communication between applets.

The PARAM tag is used in transferring text information to your applet code using the getParameter(String param_name) applet method. Since the parameter-matching code is not case sensitive and quote marks are parsed out, the following tags are equivalent:

<PARAM name=EMAIL

<param NAME=EMAIL

<param name="email"

Between the last <PARAM> tag and the </APPLET> tag, text and HTML code can be designated for display if the Web browser of a particular client system cannot recognize the <APPLET> tag. This is a good area for a message which directs users to a "vanilla" version of the transaction-enabling Web page.

The final element of the Applet tag must be </applet> in order to tell the Web browser that the applet has ended.

For additional details pertaining to Applet construction and embedding techniques, reference can be made to "JAVA" (1997) by Ed Tittel and Bill Brogden, published by IDG Books Worldwide, Inc., incorporated herein by reference.

As indicated at Block D in FIG. 7, the information files associated with the transaction-enabling HTML document and each embedded Java-Applet (e.g., code in the classes directory associated with the HTML document's URL, Java code files, class files used by the Applet, etc.) are then loaded onto an HTTP server and stored within the file management system thereof in a conventional manner. The location of the transaction-enabling HTML-encoded document will be uniquely specifiable by a URL (e.g., http://www.mastercard.com/acctinfo/request.htm1). This URL will be used in the next step of the method of the present invention.

As indicated at Block E in FIG. 7, the URL of the Applet-embedded HTML document (i.e., transaction-enabling Web page) is then encoded within a symbol structure such as a mag-stripe structure, 1-D bar code symbol, or 2-D bar code symbol, as described in detail hereinabove. In an alternative, less preferred embodiment of the present invention, the URL can be printed on a transaction card for reading by an OCR device interfaced with the Java-enabled browser of the Internet Transaction-Enabling Terminal (i.e., Client system). Once the URL is encoded within a symbol structure (i.e., mag-stripe or bar code), the location of the transaction-enabling Web document should not be moved within its designated HTTP server to ensure that the transaction-enabling Web document will be automatically launched upon reading of the URL-encoded symbol.

As indicated at Block F in FIG. 7, the Internet-based Transaction-Enabling System is now ready to deliver the information-related service associated with the Java-Applet embedded within the Web document located at the URL encoded within the symbol structure (applied to the transaction card or printed in a transaction guide or listing). To enable a desired transaction, all the consumer, customer or client has to do is to read the URL-encoded symbol on his or her transaction card using the symbol reader provided at a Transaction-Enabling Terminal of the present invention, as shown in FIGS. 1,2,3, 4 or 6. Depending on how the URL is encoded, this operation may involve, for example, either swiping a URL-encoded magstripe, or optically scanning a URL-encoded bar code symbol. In response to this automatic symbol reading operation, the Java-enabled browser at the Transaction-Enabling Terminal will automatically request the transaction-enabling Web document specified by the decoded URL, and automatically display the corresponding Web page. Preferably, a graphical icon representative of the embedded transaction-enabling Java-Applet will be conspicuously displayed on the display screen of the Transaction-Enabling Terminal, requesting that the customer initiate transactional service by touching the touch-screen (or making a key-entry operation as the case may be). Making the selection will automatically launch the Java-Applet and thus initiate the transaction associated therewith.

In an alternative embodiment of the present invention, the Applet authors can embed the transaction-enabling Java-Applet within the HTML-encoded document so that the Java-Applet is self-executing (i.e., automatically initiated upon the display of its transaction hosting Web document by the Java-enabled browser). This modification achievable through HTML-encoding and/or Java-Applet encoding, will operate to initiate the transactional process represented by the embedded Java-Applet, but would still allow the customer to conduct the transaction at a pace and speed suitable to his or her personal desire.

As the Java-Applet is executing in the intended manner by its designer (i.e., author), the customer simply follows the information display screens choreographed thereby to conduct the information-related transaction and receive the service associated therewith at a pace and speed consistent with the customer's desire. During the transaction, audio information can be delivered to the customer, as well as graphically displayed information.

At the end of the transaction, the Internet Transaction-Enabling Terminal of the present invention can produce a printed receipt for the customer as proof of service and the associated transaction. Optionally, telephone assistance can also be provided at the Internet Transaction-Enabling Terminal in the event that the customer needs to speak with a human representative for additional assistance.

An advantage of the method of the present invention detailed above is that any computer system (e.g., Web-enabled thin-client computer, or Internet-enabled kiosk, provides with a bar code or magnetic stripe reader) can be automatically transformed into a Universal Transaction Machine (UTM). Consequently, the need to construct specialized transaction machines can now be avoided in numerous applications.

Having described the illustrative embodiments of the present invention, several modifications readily come to mind.

In order to indicate that a particular printed publication or object bears a URL-encoded bar code symbol according to the present invention, and not a conventional bar code symbol (e.g., UPC Symbol), it may be advantageous to print the entire or primary portion of the encoded URL (e.g., http://www.metrologic.com) about the perimeters of the URL-encoded bar code symbol, in a similar way that UPC numbers are printed below UPC-type bar code symbols. This printing convention, once adopted, will help consumers determine which bar code symbols provide "Internet Transaction Access", in contrast with other types of bar code symbols.

In instances where the character string length of the URLs (of transaction-enabling HTML documents) becomes long, particularly in connection with Web pages that are stored in very large Web-based database management systems (DBMS), it may be desirable to pre-encode the URLs (to shorten their character string length) prior to encoding the URL within the bar code symbology being employed.

In the illustrative embodiments of the present invention disclosure, the transaction-enabling information resources have been indicated as being HTML-encoded documents stored within Web Servers, and thus, the character substring "http://www." has been included with the URL for each such information resource in accordance with the syntactical requirements of URL specification and HTTP. It is understood, however, that in some applications of the present invention, it may be desirable that URL-encoded symbols refer (i.e., point) to information resources stored on other types of Internet information servers accessible through an Internet browser and which enables a person to carry out an information-related transaction in accordance with the principles of the present invention.

It is understood that the Internet-based Transaction-Enabling System and Method of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed:

1. An Internet-based system for enabling information-related transactions over the Internet, comprising:

an HTTP information server connected to the Internet, for storing an HTML-encoded document having a location on the Internet specified by a predetermined URL, said HTTP-encoded document embodying a transaction-enabling Applet which, when executed, enables a user to conduct an information-related transaction over the Internet; and a transaction-enabling Internet terminal for requesting said HTML-encoded document and executing said transaction-enabling Applet embedded therein, said transaction-enabling Internet terminal including an Internet browser program for executing Applets, including said transaction-enabling Applet, embedded within said HTML-encoded document, a display screen for visually displaying said HTML-encoded documents, a data entry means for entering data into said Internet browser program, and a symbol reader, operably connected to said Internet browser program, for scanning a URL-encoded symbol encoded with said predetermined URL, decoding said scanned URL-encoded symbol, producing symbol character data representative of said predetermined URL, and providing said predetermined URL to said Internet browser program for accessing said HTML-encoded document whose location is specified by said predetermined URL, wherein, when said URL-encoded symbol is scanned by said code symbol reader, said scanned URL-encoded symbol is automatically decoded, symbol character data representative thereof is automatically produced and provided to said Java-enabled browser program, whereupon said Internet browser program automatically accesses said HTML-encoded document from said HTTP information server in order to execute said transaction-enabling Applet embedded therein and thereby enable the user to conduct said information-related transaction over the Internet at said transaction-enabling Internet terminal.

2. The Internet-based system of claim 1, wherein said URL-encoded symbol a URL-encoded magstripe encoded with said predetermined URL, and said symbol reader is a magstripe reader for reading said URL-encoded magstripe.

3. The Internet-based system of claim 2, wherein said URL-encoded magstripe is applied to a transaction card associated with said information-related transaction.

4. The Internet-based system of claim 1, wherein said URL-encoded symbol is a URL-encoded bar code symbol, and said symbol reader is a bar code symbol reader for reading said URL-encoded bar code symbol.

5. The Internet-based system of claim 4, wherein said bar code symbol reader is selected from the group consisting of: a laser scanning bar code symbol reader, a CCD-type bar code symbol, and a Wand-type bar code symbol reader.

6. The Internet-based system of claim 1, wherein said transaction-enabling Internet terminal comprises a hand-supportable data terminal with an integrated bar code symbol reader.

7. The Internet-based system of claim 1, wherein said transaction-enabling Internet terminal comprises a kiosk-type device having a bar code symbol reader for reading URL-encoded bar code symbols, or a magstripe reader for reading URL-encoded magstripes.

8. The Internet-based system of claim 1, wherein said transaction-enabling Internet terminal comprises a body-wearable computer system.

9. The Internet-based system of claim 1, wherein, when said URL-encoded symbol is scanned by said code symbol reader, said scanned URL-encoded symbol is automatically decoded, symbol character data representative thereof is automatically produced and provided to said Internet browser program, whereupon said Internet browser program automatically accesses said HTML-encoded document from said HTTP information server and initiates execution of said transaction-enabling Applet embedded therein, thereby enabling the user to conduct said information-related transaction over the Internet at said transaction-enabling Internet terminal.

10. An Internet-based system for enabling information-related transactions over the Internet, comprising:

an HTTP information server connected to the Internet, for storing an HTML-encoded document having a location on the Internet specified by a predetermined URL, said HTTP-encoded document embodying a transaction-enabling Java-Applet which, when executed, enables a user to conduct an information-related transaction over the Internet; and a transaction-enabling Internet terminal for requesting said HTML-encoded document and executing said transaction-enabling Java-Applet embedded therein, said transaction-enabling Internet terminal including a Java-enabled browser program for executing Java-Applets, including said transaction-enabling Java-Applet, embedded within said HTML-encoded document, a display screen for visually displaying said HTML-encoded documents, a data entry means for entering data into said Java-enabled browser program, and a symbol reader, operably connected to said Java-enabled browser program, for scanning a URL-encoded symbol encoded with said predetermined URL, decoding said scanned URL-encoded symbol, producing symbol character data representative of said predetermined URL, and providing said predetermined URL to said Java-enabled browser program for accessing said HTML-encoded document whose location is specified by said predetermined URL, wherein, when said URL-encoded symbol is scanned by said code symbol reader, said scanned URL-encoded symbol is automatically decoded, symbol character data representative thereof is automatically produced and provided to said Java-enabled browser program, whereupon said Internet browser program automatically accesses said HTML-encoded document from said HTTP information server in order to execute said transaction-enabling Java-Applet embedded therein and thereby enable the user to conduct said information-related transaction over the Internet at said transaction-enabling Internet terminal.

11. The Internet-based system of claim 10, wherein said URL-encoded symbol a URL-encoded magstripe encoded with said predetermined URL, and said symbol reader is a magstripe reader for reading said URL-encoded magstripe.

12. The Internet-based system of claim 11, wherein said URL-encoded magstripe is applied to a transaction card associated with said information-related transaction.

13. The Internet-based system of claim 10, wherein said URL-encoded symbol is a URL-encoded bar code symbol, and said symbol reader is a bar code symbol reader for reading said URL-encoded bar code symbol.

14. The Internet-based system of claim 13, wherein said bar code symbol reader is selected from the group consisting of: a laser scanning bar code symbol reader, a CCD-type bar code symbol, and a Wand-type bar code symbol reader.

15. The Internet-based system of claim 10, wherein said transaction-enabling Internet terminal comprises a hand-supportable data terminal with an integrated bar code symbol reader.

16. The Internet-based system of claim 10, wherein said transaction-enabling Internet terminal comprises a kiosk-type device having a bar code symbol reader for reading URL-encoded bar code symbols, or a magstripe reader for reading URL-encoded magstripes.

17. The Internet-based system of claim 10, wherein said transaction-enabling Internet terminal comprises a body-wearable computer system.

18. The Internet-based system of claim 10, wherein, when said URL-encoded symbol is scanned by said code symbol reader, said scanned URL-encoded symbol is automatically decoded, symbol character data representative thereof is automatically produced and provided to said Internet browser program, whereupon said Internet browser program automatically accesses said HTML-encoded document from said HTTP information server and initiates execution of said transaction-enabling Java-Applet embedded therein, thereby enabling the user to conduct said information-related transaction over the Internet at said transaction-enabling Internet terminal.

19. A method of enabling information-related transactions over the Internet, comprising the steps of:

(a) storing in an HTTP information server connected to the Internet, an HTML-encoded document having a location on the Internet specified by a predetermined URL, said HTTP-encoded document embodying a transaction-enabling Applet which, when executed, enables a user to conduct an information-related transaction over the Internet;

(b) providing a transaction-enabling Internet terminal for accessing said HTML-encoded document from said HTTP information server and executing said transaction-enabling Applet embedded therein, said transaction-enabling Internet terminal including an Internet browser program for executing Applets, including said transaction-enabling Applet, embedded within said HTML-encoded document, a display screen for visually displaying said HTML-encoded documents, a data entry means for entering data into said Internet browser program, and a symbol reader, operably connected to said Internet browser program, for scanning a URL-encoded symbol encoded with said predetermined URL, decoding said scanned URL-encoded symbol, producing symbol character data representative of said predetermined URL, and providing said predetermined URL to said Internet browser program for accessing said HTML-encoded document whose location is specified by said predetermined URLl;

(c) reading said URL-encoded symbol using said code symbol reader, whereupon symbol character data representative of said URL-encoded symbol is automatically produced and provided to said Java-enabled browser program, and said Internet browser program automatically accesses said HTML-encoded document from said HTTP information server in order to execute said transaction-enabling Applet embedded therein and thereby enable the user to conduct said information-related transaction over the Internet at said transaction-enabling Internet terminal.

20. The method of claim 19, wherein said URL-encoded symbol is a URL-encoded magstripe encoded with said predetermined URL and said code symbol reader is a magstripe reader, and step (c) comprises reading said URL-encoded magstripe using said magstripe reader.

21. The method of claim 20, wherein said URL-encoded symbol is a URL-encoded bar code symbol and said code symbol reader is a bar code symbol reader, and step (c) comprises reading said URL-encoded bar code symbol using said bar code symbol reader.

22. The method of claim 19, wherein step (c) further comprises reading said URL-encoded symbol, whereupon said Internet browser program automatically accesses said HTML-encoded document from said HTTP information server and initiates execution of said transaction-enabling Applet embedded therein, thereby enabling the user to conduct said information-related transaction over the Internet at said transaction-enabling Internet terminal.

* * * * *

UNITED STATES PATENT AND TRADEMARK OFFICE
CERTIFICATE OF CORRECTION

PATENT NO. : 5,905,248
DATED : May 18, 1999
INVENTOR(S) : Garrett Russell, David M. Wilz, Sr. and C. Harry Knowles It is certified that error appears in the above-identified patent and that said Letters Patent is hereby corrected as shown below:

Claim 1,
Line 6, delete "HTTP-encoded" and insert therefor -- HTML-encoded --;
Line 18, delete "documents" and insert therefor -- document --; and
Line 34, delete "Java-enabled" and insert therefor -- Internet --.

Claim 5,
Line 4, delete "symbol" and insert therefor -- symbol reader --.

Claim 10,
Line 6, delete "HTTP-encoded" and insert therefor -- HTML-encoded --; and
Line 19, delete "documents" and insert therefor -- document --.

Claim 14,
Line 4, delete "symbol" and insert therefor -- symbol reader --.

Claim 19,
Line 19, delete "documents" and insert therefor -- document --;
Line 30, delete "URL1" and insert therefor -- URL --; and
Line 34, delete "Java-enabled -- and insert therefor -- Internet --.

Signed and Sealed this

Eleventh Day of December, 2001

*Attest:*

NICHOLAS P. GODICI
*Attesting Officer*  Acting Director of the United States Patent and Trademark Office